(12) United States Patent
Miyagawa et al.

(10) Patent No.: US 9,313,341 B2
(45) Date of Patent: Apr. 12, 2016

(54) IMAGE TEST APPARATUS AND SYSTEM FOR CALCULATING A STACK POSITION OF A SHEET INCLUDING A DEFECTIVE IMAGE

(71) Applicants: Hiromitsu Miyagawa, Tokyo (JP); Takahiro Fukase, Kanagawa (JP)

(72) Inventors: Hiromitsu Miyagawa, Tokyo (JP); Takahiro Fukase, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 122 days.

(21) Appl. No.: 14/206,066

(22) Filed: Mar. 12, 2014

(65) Prior Publication Data

US 2014/0270396 A1    Sep. 18, 2014

(30) Foreign Application Priority Data

Mar. 15, 2013  (JP) ................................ 2013-054013
Mar. 15, 2013  (JP) ................................ 2013-054016
Feb. 10, 2014  (JP) ................................ 2014-023007

(51) Int. Cl.
*H04N 1/00* (2006.01)

(52) U.S. Cl.
CPC .......... *H04N 1/00005* (2013.01); *H04N 1/0005* (2013.01); *H04N 1/00031* (2013.01); *H04N 1/00047* (2013.01); *H04N 1/0049* (2013.01); *H04N 1/00076* (2013.01); *H04N 1/00079* (2013.01); *H04N 1/00411* (2013.01); *H04N 1/00477* (2013.01); *H04N 1/00631* (2013.01); *H04N 1/00307* (2013.01); *H04N 1/00973* (2013.01); *H04N 2201/0082* (2013.01)

(58) Field of Classification Search
None
See application file for complete search history.

(56) References Cited

FOREIGN PATENT DOCUMENTS

| JP | 2010-066516 | 3/2010 |
|----|-------------|--------|
| JP | 4677718     | 4/2011 |
| JP | 2012-093601 | 5/2012 |

*Primary Examiner* — Thomas D Lee
(74) *Attorney, Agent, or Firm* — Oblon, McClelland, Maier & Neustadt, L.L.P.

(57) ABSTRACT

An image test apparatus acquires a result of determination on a defect in a read image obtained by reading an image formed and output on a recording medium, based on a difference between the read image and a test image, acquires a sheet type of a sheet from which the read image is read, calculates a stacked position of a sheet of a defective read image in which the defect is detected among sheets stacked on a discharge tray serving as a discharge destination of the sheet of the read image, on the discharge tray based on the result of the determination on the defect in the read image and based on the acquired sheet type, and controls an indicating unit, which indicates a height at predetermined intervals in a direction in which the sheets are stacked on the discharge tray, based on the calculated stacked position.

20 Claims, 18 Drawing Sheets

MASTER IMAGE READ IMAGE

FIG.9

| COPY | PAGE | TEST IMAGE | SIDE | DESTINATION | STACKING STATE | SHEET SIZE | SHEET THICKNESS | PRESENCE/ABSENCE OF DEFECT | DEFECT LEVEL |
|---|---|---|---|---|---|---|---|---|---|
| FIRST | 1 | aaa.jpg | FRONT | TRAY 1 | ON STACK | A4 LEF | 0.25 mm | PRESENCE | NEARLY GOOD (A) |
| ... | ... | ... | ... | ... | ... | ... | ... | ... | ... |
| FIFTH | 11 | ppp.jpg | BACK | TRAY 1 | ON STACK | A4 LEF | 0.20 mm | ABSENCE | --- |
| FIFTH | 12 | qqq.jpg | FRONT | TRAY 1 | OUT OF STACK | A4 LEF | 0.20 mm | PRESENCE | OBVIOUSLY BAD (E) |
| ... | ... | ... | ... | ... | ... | ... | ... | ... | ... |

IMAGE TEST APPARATUS AND SYSTEM FOR CALCULATING A STACK POSITION OF A SHEET INCLUDING A DEFECTIVE IMAGE

CROSS-REFERENCE TO RELATED APPLICATIONS

The present application claims priority to and incorporates by reference the entire contents of Japanese Patent Application No. 2013-054013 filed in Japan on Mar. 15, 2013, Japanese Patent Application No. 2013-054016 filed in Japan on Mar. 15, 2013 and Japanese Patent Application No. 2014-023007 filed in Japan on Feb. 10, 2014.

BACKGROUND OF THE INVENTION

1. Field of the Invention

The present invention relates to an image test apparatus and an image test system.

2. Description of the Related Art

In recent years, an inspection apparatus for inspecting printed materials generates a master image as a reference image from print data, compares a read image of a printed material as a test object with the master image while aligning the positions of the images, and determines a defect of the printed material based on the degree of a difference. Therefore, when any defect occurs in an image through image formation and image output, it is possible to detect the defect.

As a method to notify a user of a defective printed material in which a defect is detected by the inspection apparatus, there is a known method to discharge the defective printed material on a different discharge tray from that of a normal printed material or to mark the defective printed material with a tape (see, for example, Japanese Patent Application Laid-open No. 2005-205797). Furthermore, there is another method to mark a discharge tray with a scale and to display, on an operation panel of an image forming apparatus or the like, the position of a printed material that needs to be taken out by a user among printed materials stacked on the discharge tray with reference to the scale (see, for example, Japanese Patent Application Laid-open No. 2012-93601).

However, when the defective printed material is discharged on the different discharge tray in the technology disclosed in Japanese Patent Application Laid-open No. 2005-205797, and if a user checks the defective printed material and confirms that it is a normal printed material, then the user needs to return the defective printed material to a correct page position in the printed materials stacked on the discharge tray on which a normal printed material is discharged, which is cumbersome for the user. Furthermore, when the defective printed material is marked with a tape, a special marking unit is needed, which leads to an increase in costs, and a printed sheet may physically be damaged due to marking. Moreover, even in the technology disclosed in Japanese Patent Application Laid-open No. 2012-93601, a user needs to check the printed materials while comparing the scale of the discharge tray displayed on the operation panel with the scale marked on the discharge tray; therefore, the check operation may become cumbersome.

Therefore, there is a need for an image test apparatus capable of indicating the position of a defective printed material in a simpler and easier manner than in a conventional technology.

SUMMARY OF THE INVENTION

According to an embodiment, an image test apparatus tests a read image obtained by reading an image formed and output on a recording medium. The image test apparatus includes a test result acquiring unit, a sheet type acquiring unit, a stacked position calculator, an indicating unit, and an indication control unit. The test result acquiring unit is configured to acquire a result of determination on a defect in the read image based on a difference between the read image and a test image for testing the read image. The sheet type acquiring unit is configured to acquire a sheet type of a sheet from which the read image is rea. The stacked position calculator is configured to calculate a stacked position of a sheet of a defective read image, which is an image in which the defect is detected in the determination on the defect among sheets stacked on a discharge tray serving as a discharge destination of the sheet of the read image, on the discharge tray based on the result of the determination on the defect in the read image and based on the acquired sheet type. The indicating unit is configured to indicate a height at predetermined intervals in a direction in which the sheets are stacked on the discharge tray. The indication control unit is configured to control the indicating unit based on the calculated stacked position.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a diagram illustrating test results of the comparison test according to the embodiment of the present invention;

DETAILED DESCRIPTION OF THE PREFERRED EMBODIMENTS

Figure 1:
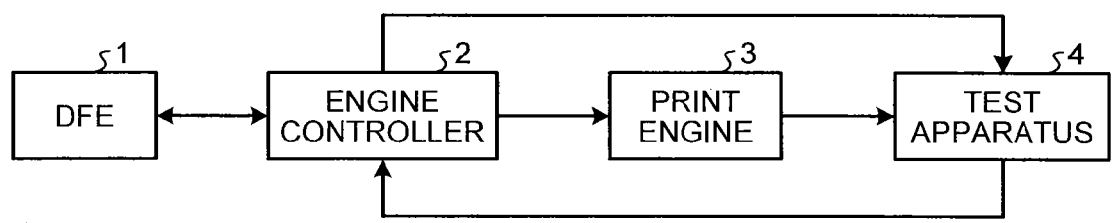
FIG. 1 is a diagram illustrating a configuration of an image forming system including a test apparatus according to an embodiment of the present invention.

Embodiments of the present invention will be explained in detail below with reference to the accompanying drawings. In a first embodiment, in an image test system including a test apparatus that compares a read image obtained by reading an output result of a formed image with a master image to test the output result, a feature is to indicate a position where a sheet determined as defective is stacked. FIG. 1 is a diagram illustrating an overall configuration of an image forming system according to the present embodiment. As illustrated in FIG. 1, the image forming system according to the present embodiment includes a digital front end (DFE) 1, an engine controller 2, a print engine 3, and a test apparatus 4.

The DFE 1 generates image data to be printed out based on a received print job, that is, bitmap data as an output target image, and outputs the generated bitmap data to the engine controller 2. The engine controller 2 causes the print engine 3 to form and output an image based on the bitmap data received from the DFE 1. Furthermore, the engine controller 2 according to the present embodiment transmits, to the test apparatus 4, the bitmap data received from the DFE 1 as information used as a source of a test image to be referred to when the test apparatus 4 tests an image formed and output by the print engine 3.

The print engine 3 is an image forming apparatus that forms and outputs an image based on the bitmap data on a sheet as a recording medium, under the control of the engine controller 2. Incidentally, any material, such as a film or a sheet material made of plastic or the like, which can be used as an object to form and output an image may be employed as the recording medium, in addition to the sheet as described above. The test apparatus 4 generates a master image based on the bitmap data input by the engine controller 2. The test apparatus 4 is an image test apparatus that compares a read image generated by causing a reading device to read the sheet output by the print engine 3 with the master image generated as described above, to thereby test an output result.

When determining that there is a defect in the output result by comparison of the master image and the read image, the test apparatus 4 notifies the engine controller 2 of information indicating a page determined as defective. Therefore, the engine controller 2 controls re-printing of the defective page.

Figure 2:
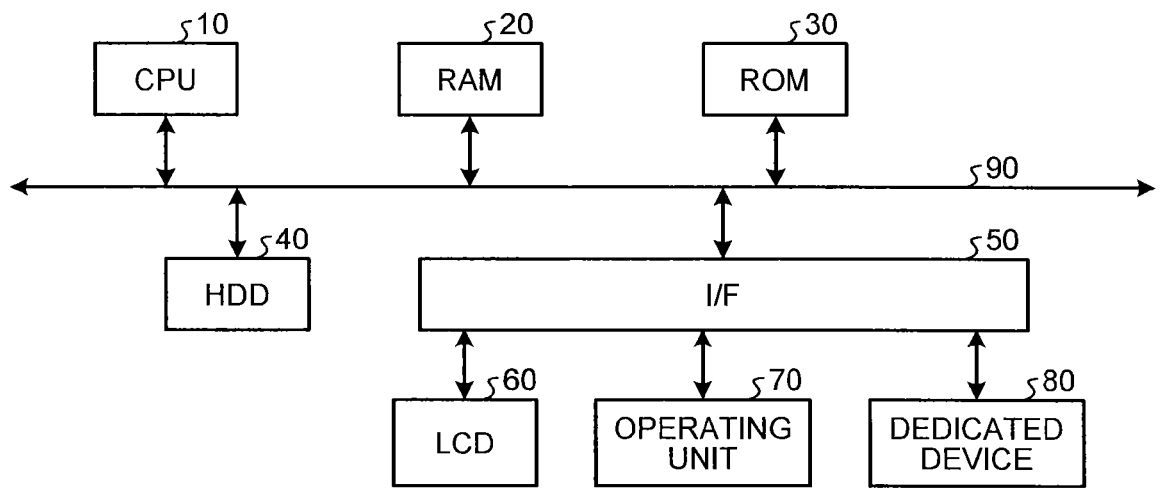
FIG. 2 is a block diagram illustrating a hardware configuration of the test apparatus according to the embodiment of the present invention.

Hardware configurations of functional blocks of the engine controller 2, the print engine 3, and the test apparatus 4 according to the present embodiment will be explained below with reference to FIG. 2. FIG. 2 is a block diagram illustrating the hardware configuration of the test apparatus 4 according to the present embodiment. While the hardware configuration of the test apparatus 4 is illustrated in FIG. 2, the engine controller 2 and the print engine 3 have the same hardware configurations.

As illustrated in FIG. 2, the test apparatus 4 according to the present embodiment has the same configuration as a general information processing apparatus, such as a personal computer (PC) or a server. Specifically, the test apparatus 4 according to the present embodiment includes a central processing unit (CPU) 10, a random access memory (RAM) 20, a read only memory (ROM) 30, a hard disk drive (HDD) 40, and an interface (I/F) 50, all of which are connected to one another via a bus 90. Furthermore, a liquid crystal display (LCD) 60, an operating unit 70, and a dedicated device 80 are connected to the I/F 50.

The CPU 10 is an arithmetic unit and controls the entire operation of the test apparatus 4. The RAM 20 is a volatile storage medium that can read and write information at high speed, and is used as a work area by the CPU 10 to process information. The ROM 30 is a read-only non-volatile storage medium, and stores therein programs, such as firmware. The HDD 40 is a non-volatile storage medium that can read and write information, and stores therein an operating system (OS), various control programs, application programs, or the like.

The I/F 50 connects various types of hardware and networks to the bus 90 and controls the connected devices. The LCD 60 is a visual user interface that allows a user to check the state of the test apparatus 4. The operating unit 70 is a user interface, such as a keyboard or a mouse, that allows a user to input information to the test apparatus 4.

The dedicated device 80 is hardware for implementing functions specific to the engine controller 2, the print engine 3, or the test apparatus 4. In the case of the print engine 3, the dedicated device 80 may be a conveying mechanism that conveys sheets on which images are formed and output or may be a plotter that forms and outputs images on the sheets. In the case of the engine controller 2 and the test apparatus 4, the dedicated device 80 may be a dedicated arithmetic device that performs image processing at high speed. The arithmetic device as described above may be configured as, for example, an application specific integrated circuit (ASIC). Furthermore, the reading device that reads images output on the sheets is also included.

In the hardware configurations as described above, programs stored in the ROM 30, the HDD 40, or a recording medium such as an optical disk (not illustrated) are loaded into the RAM 20, and the CPU 10 performs calculations according to the programs to implement a software control unit. The software control unit implemented as described above and the hardware are combined to realize the functional blocks that implement the functions of the engine controller 2, the print engine 3, and the test apparatus 4 according to the present embodiment.

Figure 3:
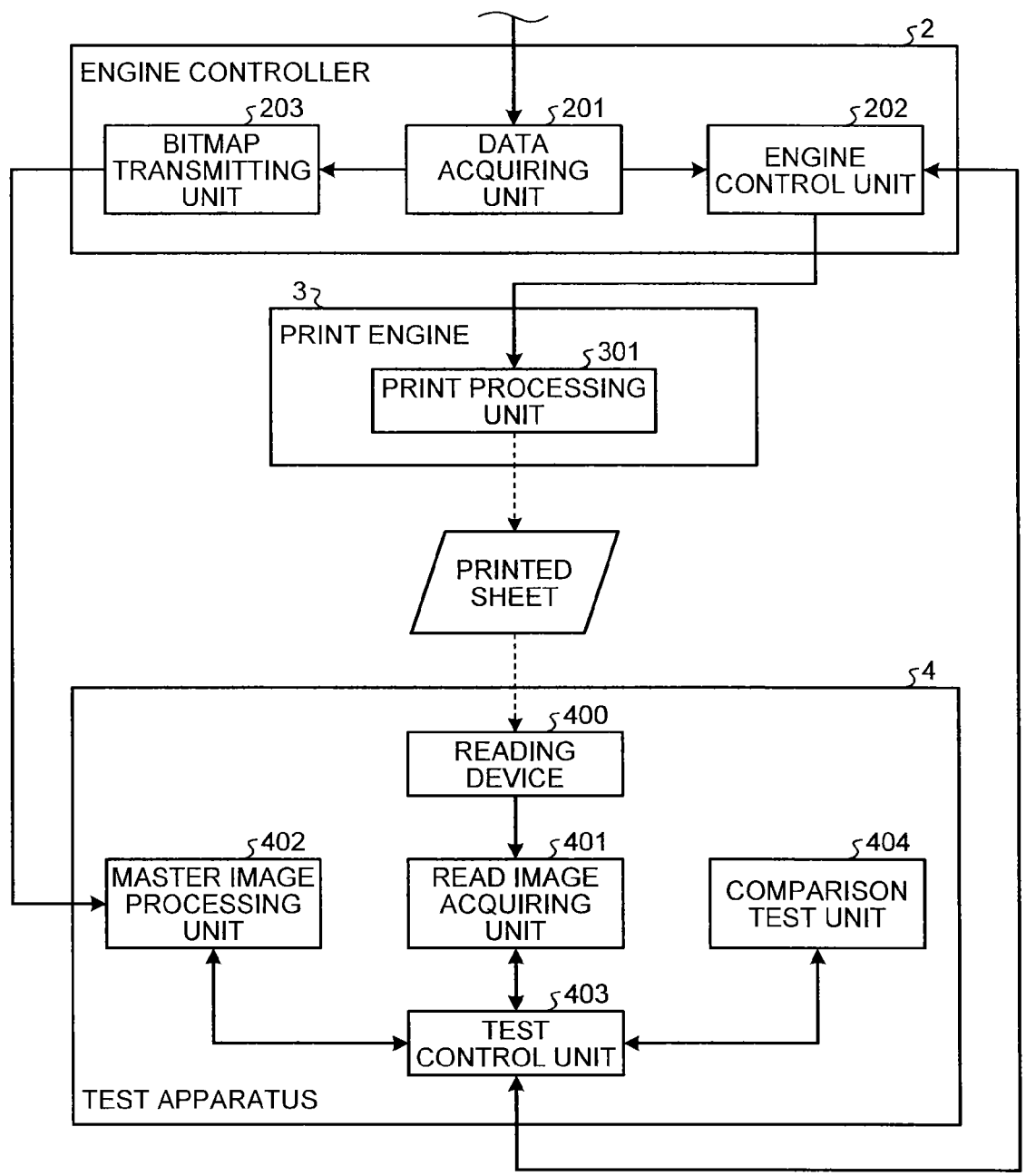
FIG. 3 is a block diagram illustrating functional configurations of an engine controller, a print engine, and the test apparatus according to the embodiment of the present invention.

FIG. 3 is a block diagram illustrating functional configurations of the engine controller 2, the print engine 3, and the test apparatus 4 according to the present embodiment. In FIG. 3, data transmission and reception is indicated by solid lines and the flow of sheets is indicated by dashed lines. As illustrated in FIG. 3, the engine controller 2 according to the present embodiment includes a data acquiring unit 201, an engine control unit 202, and a bitmap transmitting unit 203. The print engine 3 includes a print processing unit 301. The test apparatus 4 includes a reading device 400, a read image acquiring unit 401, a master image processing unit 402, a test control unit 403, and a comparison test unit 404.

The data acquiring unit 201 acquires the bitmap data input by the DFE 1 and operates the engine control unit 202 and the bitmap transmitting unit 203. The bitmap data is information on all of pixels of an image to be formed and output. The data acquiring unit 201 functions as an image information acquiring unit. The engine control unit 202 causes the print engine 3 to form and output an image based on the bitmap data transferred from the data acquiring unit 201. The bitmap transmitting unit 203 transmits the bitmap data acquired by the data acquiring unit 201 to the test apparatus 4 to generate a master image.

The print processing unit 301 acquires the bitmap data input by the engine controller 2, forms and outputs an image on a printing sheet, and outputs the printed sheet. The print processing unit 301 according to the present embodiment is implemented by a general image forming mechanism of an electrophotographic system. However, it may be possible to employ other image forming mechanisms, such as an ink jet system.

The reading device 400 is an image reading unit that reads the image formed on the surface of the printed sheet output by the print processing unit 301, and outputs the read data. The reading device 400 is, for example, a line scanner provided on a conveying path of the printed sheet output by the print processing unit 301 within the test apparatus 4, and scans the surface of the printed sheet being conveyed to thereby read an image formed on the surface.

The read image generated by the reading device 400 is used as a test object of the test apparatus 4. The read image is generated by reading the surface of the sheet output through image formation and output, and therefore represents an output result.

The read image acquiring unit 401 acquires information on the read image that the reading device 400 has generated by reading the surface of the printed sheet. The information on the read image acquired by the read image acquiring unit 401 is input to the comparison test unit 404 for a comparison test. Incidentally, the read image is input to the comparison test unit 404 under the control of the test control unit 403. In this case, the read image is input to the comparison test unit 404 after the test control unit 403 has acquired the read image.

The master image processing unit 402 acquires the bitmap data input by the engine controller 2 as described above, and generates a master image that is a test image to be compared with a test target image. Namely, the master image processing unit 402 functions as a test image generating unit that generates, based on the output target image, a master image used as a test image to test the read image. A master image generation process performed by the master image processing unit 402 will be explained in detail later.

Information on the master image generated by the master image processing unit 402 is input to the comparison test unit 404 for the comparison test. Incidentally, the master image is input to the comparison test unit 404 under the control of the test control unit 403. In this case, the master image is input to the comparison test unit 404 after the test control unit 403 has acquired the master image.

The test control unit 403 is a control unit that controls the entire operation of the test apparatus 4. The components included in the test apparatus 4 operate under the control of the test control unit 403.

The comparison test unit 404 compares the read image acquired by the read image acquiring unit 401 with the master image generated by the master image processing unit 402, and determines whether a desired image has been formed and output. The comparison test unit 404 is implemented by an ASIC as described above in order to rapidly perform huge amount of calculations.

In the present embodiment, the test control unit 403 functions as an image test unit by controlling the comparison test unit 404, and also functions as a test result acquiring unit to acquire test results obtained by the comparison test unit 404.

The comparison test unit 404 performs pixel-by-pixel comparison between the read image and the master image, each having the resolution of 200 dots per inch (dpi) with 8-bit RGB colors, and calculates difference values of pixel values of the 8-bit RGB colors for each of the pixels. The comparison test unit 404 determines whether there is a defect in the read image based on a magnitude relationship between each of the difference values calculated as described above and a threshold. Namely, the test control unit 403 functions as an image test unit by controlling the components included in the test apparatus 4.

Figure 4:
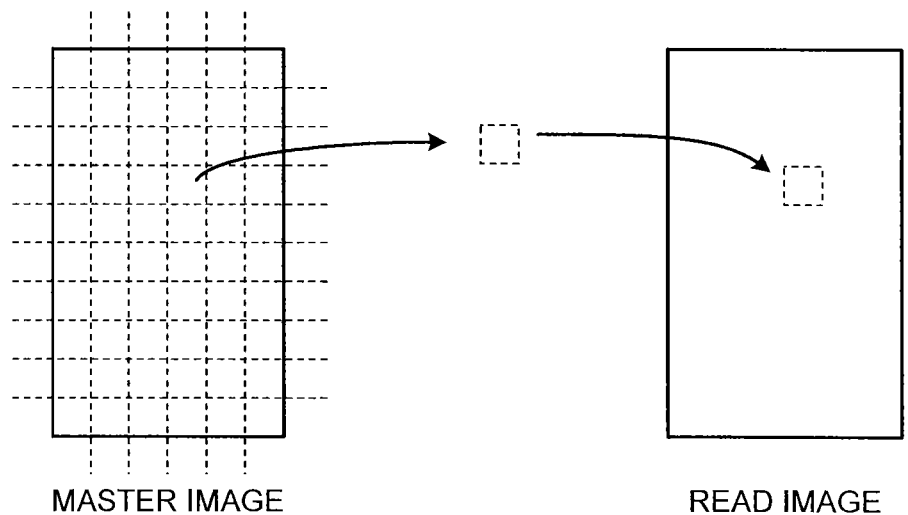
FIG. 4 is a diagram illustrating an example of a comparison test according to the embodiment of the present invention.

Incidentally, when comparing the read image and the master image, as illustrated in FIG. 4, the comparison test unit 404 overlaps the read image divided for each of predetermined regions with the master image corresponding to the divided region, and calculates the pixel value of each of the pixels, that is, calculates a difference in the density. Furthermore, the position at which the divided region is overlapped with the master image is gradually shifted in the height and width directions to determine a position at which the calculated difference value becomes the smallest as a correct overlapping position, and employs the difference value calculated at this position as a comparison result.

Moreover, because the difference value is calculated for each of the divided regions instead of calculating the difference value by overlapping the entire read image with the master image, when a difference value is to be calculated in a region near a certain region, it becomes possible to reduce the amount of shift of the image in the height and width directions by using a comparison result of the difference value calculated in the certain region. Therefore, it becomes possible to reduce the total amount of calculations. Furthermore, even when the scale of the entire read image differs from the scale of the entire master image, because the positional alignment is performed after the image is divided into the regions as illustrated in FIG. 4, it becomes possible to reduce the influence of the difference in the scale.

Incidentally, as a method to compare the magnitudes of the difference value and the threshold, the test control unit 403 according to the present embodiment compares a difference value that the comparison test unit 404 has calculated for each of the pixels with a threshold set in advance. Therefore, the test control unit 403 acquires, as a comparison result, information indicating whether a difference between the master image and the read image exceeds a predetermined threshold for each of the pixels. Namely, it becomes possible to detect whether each of the pixels of the read image is defective. Furthermore, the size of each of the divided regions illustrated in FIG. 4 is determined based on, for example, a region in which the comparison test unit 404 implemented by an ASIC as described above can compare pixel values at one time.

Furthermore, in the present embodiment, an example is described in which the comparison test unit 404 calculates a difference value between a pixel of the master image and a pixel of the read image and outputs the difference value, and the test control unit 403 compares the difference value with the threshold. Alternatively, the comparison test unit 404 may compare the difference value with the threshold, and the test control unit 403 may acquire a result of the comparison, that is, information on whether a difference from a corresponding pixel of the master image exceeds the threshold for each of the pixels of the read image.

Figure 5:
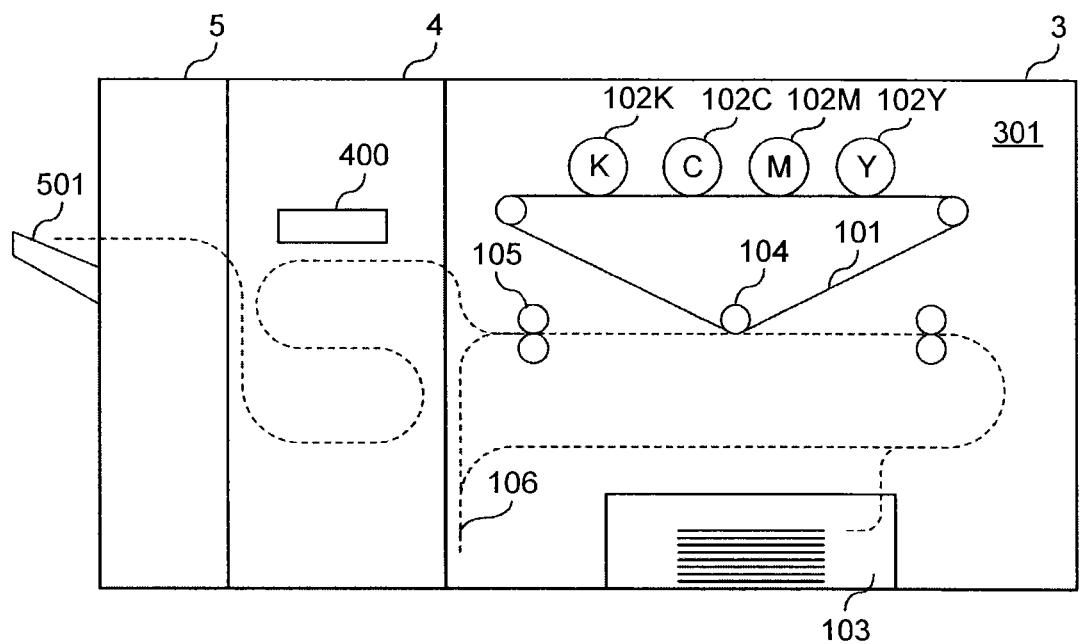
FIG. 5 is a diagram illustrating configurations of the print engine, the test apparatus, and a stacker according to the embodiment of the present invention.

Mechanical configurations of the print engine 3, the test apparatus 4, and a stacker 5 and a sheet conveying path will be explained below with reference to FIG. 5. As illustrated in FIG. 5, the print processing unit 301 of the print engine 3 according to the present embodiment is a so-called tandem type, in which color photoconductor drums 102Y, 102M, 102C, and 102K (hereinafter, collectively referred to as a "photoconductor drum 102") are arranged along a conveying belt 101 serving as an endless moving unit. Specifically, the multiple photoconductor drums 102Y, 102M, 102C, and 102K are arranged in sequence from the upstream side in the conveying direction of the conveying belt 101, along the conveying belt 101 that is an intermediate transfer belt on which an intermediate transfer image is formed so as to be transferred to a sheet (an example of the recording medium) fed from a sheet feed tray 103.

Images of different colors developed with toner on the surfaces of the photoconductor drums 102 of the different colors are transferred to the conveying belt 101 in a superimposed manner, so that a full-color image is formed. The full-color image formed on the conveying belt 101 as described above is transferred to the surface of the sheet conveyed on the conveying path by the function of a transfer roller 104 at the position closest to the sheet conveying path.

The sheet on which the image is formed is further conveyed to a fixing roller 105, at which the image is fixed, and then conveyed to the test apparatus 4. In the case of duplex printing, the sheet bearing the image on one side thereof is conveyed to a reverse path 106 to reverse the sheet, and the reversed sheet is conveyed to a transfer position of the transfer roller 104 again.

The reading device 400 reads, in the sheet conveying path inside the test apparatus 4, the surface of each of the sheets conveyed from the print processing unit 301, generates a read image, and outputs the read image to the read image acquiring unit 401 implemented by an information processing apparatus inside the test apparatus 4. Furthermore, the sheet, the surface of which has been read by the reading device 400, is further conveyed inside the test apparatus 4 toward the stacker 5 and discharged to a discharge tray 501. Incidentally, in FIG. 5, an example is illustrated in which the reading device 400 is provided on only one side of the sheet in the sheet conveying path of the test apparatus 4. However, it may be possible to provide the reading devices 400 on both sides of the sheet to enable to test the both sides of the sheet.

Figure 6:
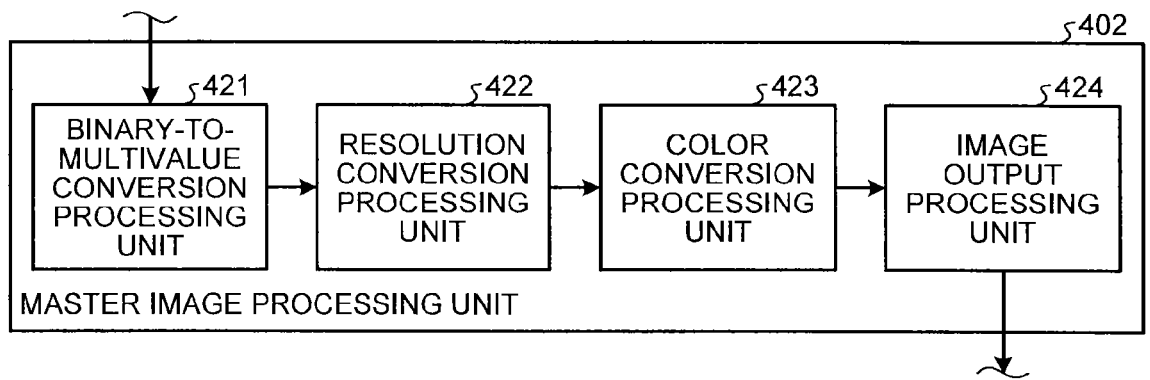
FIG. 6 is a block diagram illustrating a functional configuration of a master image processing unit according to the embodiment of the present invention.

Functions of the master image processing unit 402 will be explained in detail below with reference to FIG. 6. FIG. 6 is a block diagram illustrating an internal configuration of the master image processing unit 402. As illustrated in FIG. 6, the master image processing unit 402 includes a binary-to-multivalue conversion processing unit 421, a resolution conversion processing unit 422, a color conversion processing unit 423, and an image output processing unit 424. Incidentally, the master image processing unit 402 according to the present embodiment is implemented by causing the dedicated device 80 illustrated in FIG. 2, that is, hardware implemented by an ASIC, to operate under the control of software.

The binary-to-multivalue conversion processing unit 421 performs binary-to-multivalue conversion process on a color or monochrome binary image, to thereby generate a multi-valued image. The bitmap data according to the present embodiment is information to be input to the print engine 3, and the print engine forms and outputs images based on binary images of respective colors of CMYK (cyan, magenta, yellow, and black). In contrast, the read image as the test target image is a multivalued image with multiple tones of three primary colors of RGB (red, green, and blue). Therefore, the binary-to-multivalue conversion processing unit 421 first converts a binary image to a multivalued image. As the multivalued image, for example, an 8-bit CMYK image may be used.

Incidentally, while an example is explained in the present embodiment that the print engine 3 forms and outputs an image based on the CMYK binary image and the master image processing unit 402 includes the binary-to-multivalue conversion processing unit 421, this is a mere example. Specifically, if the print engine 3 forms and outputs an image based on a multivalued image, the binary-to-multivalue conversion processing unit 421 may be omitted.

The resolution conversion processing unit 422 converts the resolution of the multivalued image generated by the binary-to-multivalue conversion processing unit 421 such that the resolution coincides with the resolution of the read image serving as a test target image. In the present embodiment, the reading device 400 generates the read image of 200 dpi. Therefore, the resolution conversion processing unit 422 converts the resolution of the multivalued image generated by the binary-to-multivalue conversion processing unit 421 to 200 dpi.

The color conversion processing unit 423 acquires the image in which the resolution is converted by the resolution conversion processing unit 422, and performs color conversion. As described above, in the present embodiment, the read image is an image in the RGB format. Therefore, the color conversion processing unit 423 converts the image in the CMYK format with the resolution converted by the resolution conversion processing unit 422 into an image in the RGB format. Therefore, a multivalued image of 200 dpi, in which each of pixels is represented by 8-bit RGB colors (24 bits in total), is generated. Namely, in the embodiment, the binary-to-multivalue conversion processing unit 421, the resolution conversion processing unit 422, and the color conversion processing unit 423 function as a test image generating unit.

The image output processing unit 424 performs a magnification change process on the 8-bit color image with the resolution of 200 dpi generated through the process by the color conversion processing unit 423, so that the size of the read image input by the reading device 400 of the print engine 3 to the test apparatus 4 and the size of the master image are adjusted and positional deviation of the images is reduced.

In the system as described above, a feature of the present embodiment is to indicate a stacked position of a printed material in which a defect is detected (hereinafter, referred to as a "defective printed material") among printed materials conveyed from the test apparatus 4 to the stacker 5 and discharged and stacked on the discharge tray 501. A configuration of the stacker 5 and a process for indicating a stacked position of a defective printed material according to the present embodiment will be explained below.

Figure 7:
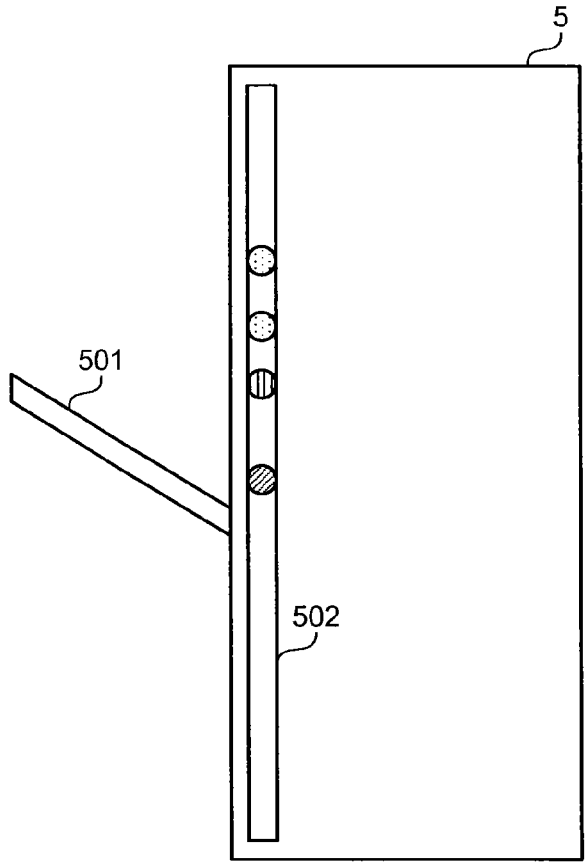
FIG. 7 is a diagram illustrating a configuration of the stacker according to the embodiment of the present invention.

FIG. 7 is a diagram illustrating a configuration of the stacker 5 according to the present embodiment. As illustrated in FIG. 7, the stacker 5 includes, in addition to the discharge tray 501, an indicating unit 502 that indicates a stacked position of a defective printed material stacked on the discharge tray 501. The indicating unit 502 includes light-emitting elements, such as light emitting diodes (LEDs), arranged at predetermined intervals in the vertical direction with respect to a sheet stacking surface of the discharge tray 501.

The indicating unit 502 turns on an LED located at the same height as a defective printed material stacked on the discharge tray 501, so that a stacked position of the defective printed material is indicated by the height of the LED. Incidentally, as illustrated in FIG. 7, it may be possible to change the colors of the LEDs (hatching patterns in FIG. 7) according to defect levels that are determined in advance as the levels of defects of defective printed materials. Furthermore, it may be possible to change lighting patterns (blinking, interval of blinking, or the like). Moreover, it may be possible to change the colors or the lighting patterns of the LEDs depending on the stacked positions or the types of print jobs.

Figure 8:
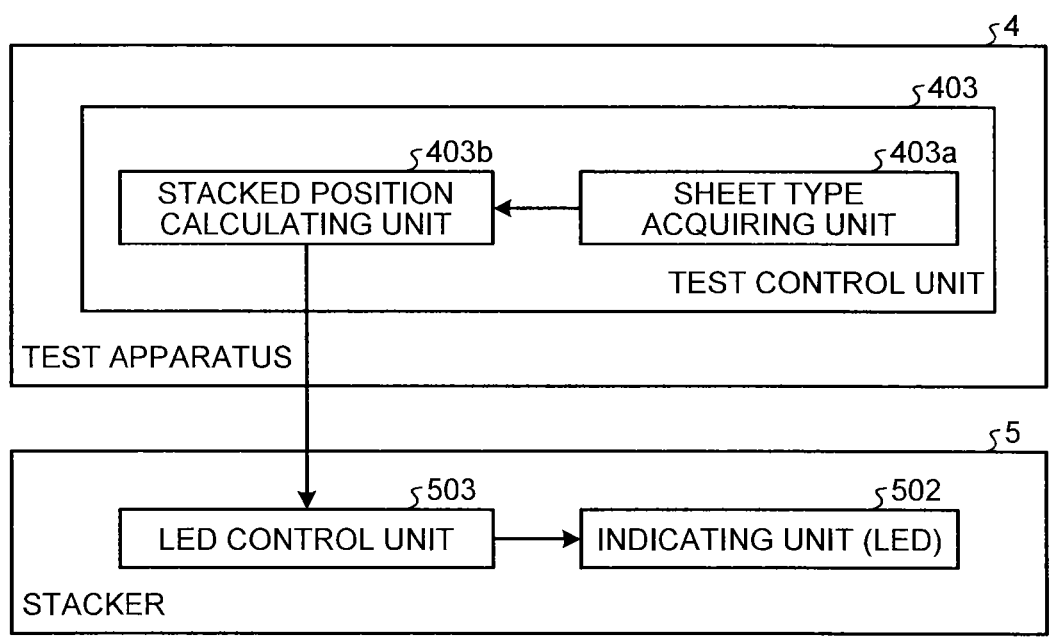
FIG. 8 is a block diagram illustrating functional configurations of the test apparatus and the stacker for indicating a stacked position according to the embodiment of the present invention.

A process for indicating a stacked position of a defective printed material will be explained below. FIG. 8 is a block diagram illustrating an example of functional configurations of the test apparatus 4 and the stacker 5 related to the process for indicating a stacked position of a defective printed material. As illustrated in FIG. 8, the test apparatus 4 includes the test control unit 403, and the stacker 5 includes an LED control unit 503 that controls the LEDS of the indicating unit 502. Furthermore, the test control unit 403 includes a sheet type acquiring unit 403a and a stacked position calculating unit 403b.

The sheet type acquiring unit 403a and the stacked position calculating unit 403b acquire the test results as illustrated in FIG. 9 from the comparison test unit 404, determines presence or absence of a defective printed material, and calculates a stacked position of the defective printed material when the defective printed material is present based on the acquired test results. FIG. 9 is a diagram illustrating an example of the test results. As illustrated in FIG. 9, for example, a test result is represented in a table containing, as a single set (in a single row), a copy number of a printed material, a page number, a tested image, a printed side (front or back), a printed material discharge destination, a stacked state indicating whether a printed material is stacked on a discharge tray or taken out from the discharge tray, a sheet size, a sheet thickness, presence/absence of a defect, and a defect level. Specifically, the sheet type acquiring unit 403a acquires a sheet type, such as the sheet size or the sheet thickness, contained in the test result of a sheet from which an image is read, and the stacked position calculating unit 403b calculates the stacked position of the defective printed material based on the test result and the sheet type.

Furthermore, from the test result as described above, the total number of test results is calculated based on the total number of rows of the test results illustrated in FIG. 9. Moreover, in the case of a duplex printing job, test results of two pages of the front side and the back side, that is, test results in two rows, are provided.

The stacked position calculating unit 403b can acquire, from the test results as described above, the total number of printed materials (printed sheets) stacked on the discharge tray 501, the order of a defective printed material in the printed materials stacked on the discharge tray 501, a defect level of the defective printed material, or the like. Specifically, the total number of the printed sheets stacked on the discharge tray 501 is obtained by subtracting the number of rows indicating the stacked state of "taken out" from the total number of rows in the test result that indicate the total number of the test results.

Furthermore, the order of the defective printed material can be specified by the number assigned to a row containing "presence" in the field of presence/absence of a defect. Incidentally, in the case of a duplex printing job, the test results in two rows for the front side and the back side are collectively counted as one as the number of sheets. Furthermore, the defect level is divided into, for example, A to E such that "A" is assigned when the degree of a defect in a test result is "close to good quality" and "E" is assigned when the degree of a defect is "obviously bad". Meanwhile, it may be possible to determine a printed material that meets a predetermined defect level condition (for example, the defect level C or lower) as a defective printed material among the printed materials indicating "presence" in the field of presence/absence of a defect.

Figure 10:
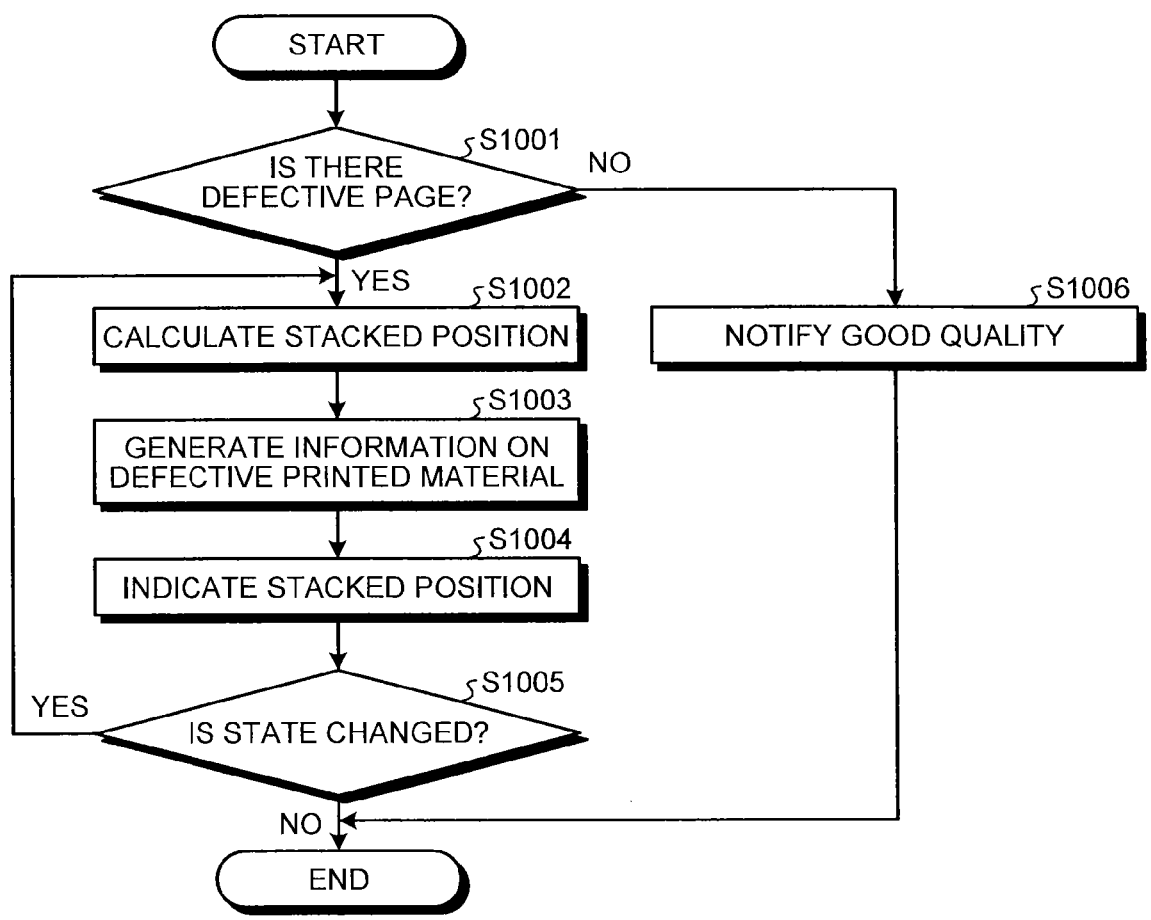
FIG. 10 is a flowchart illustrating the flow of a process for indicating a stacked position of a defective printed material according to the embodiment of the present invention.

The flow of a process for indicating a stacked position of a defective printed material by the sheet type acquiring unit 403a, the stacked position calculating unit 403b, and the LED control unit 503 will be explained below with reference to FIG. 10. When the stacked position calculating unit 403b acquires the test results as described above from the comparison test unit 404, and if all of the printed materials are good quality, that is, if all of the fields of presence/absence of a defect indicate "absence" in the acquired test results (NO at S1001), the stacked position calculating unit 403b notifies the LCD 60 of the test apparatus 4 or the like that all of the printed materials are good quality (S1006), and terminates the process. In contrast, if there is a defective printed material, that is, if there is a defective printed material indicating "presence" in the field of presence/absence of a defect in the acquired test results (YES at S1001), the stacked position calculating unit 403b calculates the stacked position of the defective printed material (S1002).

A method to calculate a stacked position of a defective printed material based on the test results will be explained in detail below. The stacked position corresponds to the height from the sheet stacking surface of the discharge tray 501 to the defective printed material. Therefore, the stacked position can be obtained based on the thickness and the number of the stacked printed sheets acquired by the sheet type acquiring unit 403a. However, it is necessary to take into account the fact that a printed sheet is increasingly pressed due to the weights of other sheets as more and more other printed sheets are stacked thereon and the thicknesses of the printed sheet becomes thinner than in the case where no printed sheet is stacked on the printed sheet (that is, the stacked position is lowered). Therefore, when a defective printed material is present between other printed materials stacked on the discharge tray 501, the fact is taken into account that the stacked position is lowered due to the influence of sheets stacked on the defective printed material.

First, the thickness of an i-th sheet among a total of n printed sheets stacked on the discharge tray 501 is calculated. Assuming that a normal thickness of the i-th sheet before other sheets are stacked on the i-th sheet is denoted by $x_i$, a thickness $x'_1$ of the i-th sheet when the influence of the other stacked sheets is taken into account is obtained by Equation (1) below, where n and i are integers.

$$x'_i = x_i - f(n,i) \quad (1 \le i \le n) \tag{1}$$

Incidentally, f(n, i) is a function to calculate the amount of decrease in the thickness of the i-th sheet among the n sheets due to the pressure applied by the other stacked sheets. Namely, the number of sheets stacked on a target sheet is reduced as the value of i approaches the value of n, so that the value of f(n, i) is reduced. Furthermore, when i=n, f(n, i)=0 because no sheet is stacked on the target sheet.

When the n printed materials are stacked on the discharge tray 501, and if an m-th sheet is a defective printed material according to Equation (1), the height from the discharge tray 501 to the m-th defective printed material, that is, a stacked position $H_m$, is obtained by Equation (2) below.

$$H_m = \sum_{i=1}^{m} x'_i = \sum_{i=1}^{m} \{x_i - f(n, i)\} \tag{2}$$

Incidentally, in the present embodiment, it is assumed that the position of the discharge tray 501 is fixed. Therefore, the stacked position of the defective printed material is calculated as the height of the defective printed material with reference to the position of the stacking surface of the discharge tray 501. In contrast, when the discharge tray 501 moves up and down depending on the number of printed sheets, the stacked position is calculated, with reference to the position of the bottom surface of the stacker 5, as a sum of the height from the bottom surface of the stacker 5 to the discharge tray 501 and the height obtained by Equation (2).

Furthermore, in the present embodiment, it is assumed that only printed materials included in the test results of a single print job are stacked on the discharge tray 501. However, if printed materials of other print jobs are already stacked or a new printed material is to be stacked, the stacked position is calculated by taking into account the thickness of the already-stacked printed materials or a change in the sheet thickness due to stacking of the new printed material.

The stacked position calculating unit 403b that has calculated the stacked position of each of the defective printed materials generates defective printed material information containing the calculated stacked positions and defect levels of the defective printed materials corresponding to the respective stacked positions, and outputs the information to the LED control unit 503 (S1003). Upon receiving the defective printed material information, the LED control unit 503 controls the LEDs of the indicating unit 502 corresponding to the respective stacked positions of the defective printed materials contained in the received defective printed material information, and causes the LEDs to emit light in colors corresponding to the respective defect levels of the defective printed materials to thereby indicate the respective stacked positions of the defective printed materials (S1004). Namely, the LED control unit 503 functions as an indication control unit that controls the LEDs of the indicating unit 502. Furthermore, the LED control unit 503 may be included in the test apparatus 4.

After the stacked position of each of the defective printed materials is indicated, if the stacked position calculating unit 403b detects a change in the state, such as that the printed material is taken out from the discharge tray 501 or the defect level condition to turn on the LEDs of the indicating unit 502 is changed (YES at S1005), the stacked position calculating unit 403b re-calculates the stacked position of each of the defective printed materials (S1002). In contrast, if the stacked position calculating unit 403b does not detect a change in the state (NO at S1005), the process is terminated.

Whether the printed material is taken out is detected by, for example, causing a user to send a notice of a printed material that he/she has taken out via the operating unit 70 of the test apparatus 4. Similarly, a change in the defect level condition is detected by, for example, causing a user to send a notice of the change via the operating unit 70 of the test apparatus 4. Then, the stacked position calculating unit 403b deletes a defective printed material that need not be indicated or adds information on a defective printed material that needs to be indicated from and to the defective printed material information according to the change in the defect level condition. In this case, when adding the information on a defective printed material that needs to be indicated, the stacked position calculating unit 403b newly calculates a stacked position of the defective printed material to be added.

As described above, through the above process, the test apparatus 4 can easily indicate the stacked position of the defective printed material without discharging the defective printed material to a different tray or marking the defective printed material.

Furthermore, a user can recognize the stacked position of the defective printed material by only checking the indicating unit 502 of the stacker 5 and need not compare the display on the operation panel and the scale marked on the discharge tray. Therefore, it becomes easier for the user to recognize the indication of the defective printed material. Moreover, when the stacked position is to be calculated, the influence of the weights of other sheets stacked on a target sheet is taken into account. Therefore, it becomes possible to more accurately calculate the stacked position.

Incidentally, in the present embodiment, a concrete example is described in which the stacked position is calculated based on the thickness of the printed sheet as illustrated in FIG. 9. However, it may be possible to take into account other elements, such as a sheet size, a weight, or hardness, related to the type of the printed sheet. Furthermore, when a sheet is output after being folded in half, it may be possible to take into account a parameter related to post-processing performed on the sheet after printing.

Figure 11:
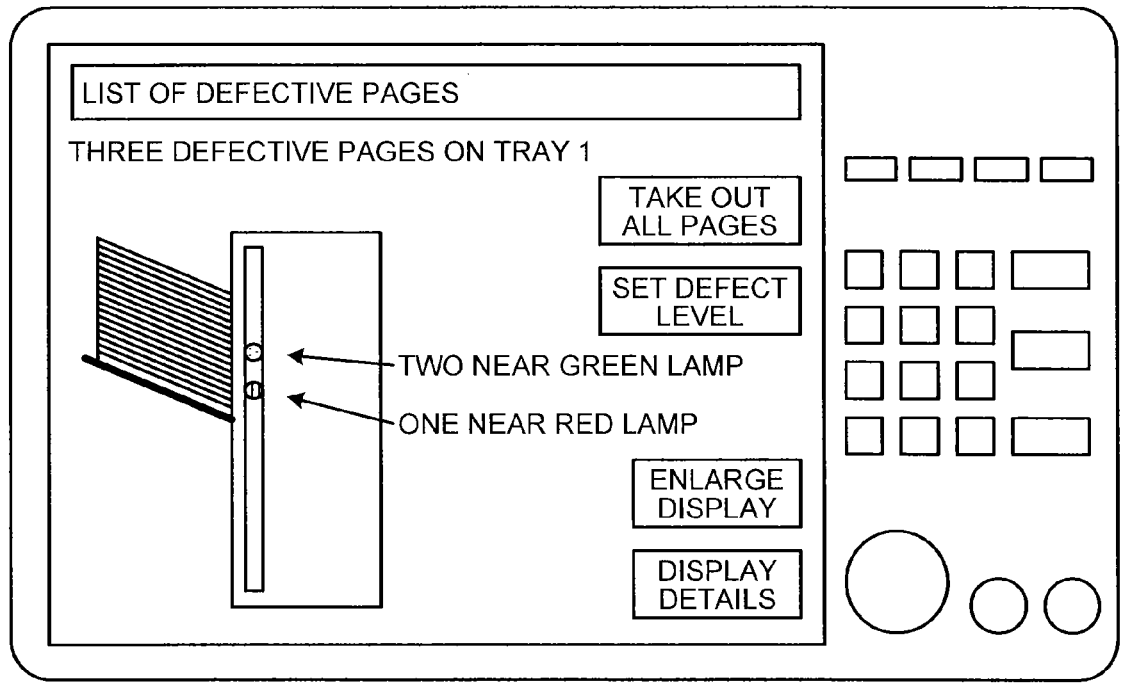
FIG. 11 is a diagram illustrating a screen for displaying a list of stacked positions of defective printed materials on a display screen of the test apparatus according to the embodiment of the present invention.

Moreover, in addition to the above embodiment, a display control unit (not illustrated) of the test apparatus 4 may display, on the LCD 60 or the like, detailed information on the defective printed material based on the test result obtained by the comparison test unit 404 or based on the stacked position calculated by the stacked position calculating unit 403b. FIG. 11 is a diagram illustrating an example of a screen for displaying a list of the stacked positions of the defective printed materials on the LCD 60 serving as a display unit of the test apparatus 4. As illustrated in FIG. 11, it is indicated, on the display, that there are a total of three defective printed materials, in particular, two defective printed materials near a green lamp blinking in the indicating unit 502 (dot hatching in FIG. 11) and one defective printed material near a red lamp (vertically-striped hatching in FIG. 11), among the printed materials stacked on the discharge tray 501.

Furthermore, various buttons are provided in the display screen illustrated in FIG. 11. Specifically, the test apparatus 4 is notified that all of the printed materials stacked on the discharge tray 501 have been taken out when a "take out all pages" button is pressed, and the screen is switched to another screen for changing the defect level condition to determine a defective printed material when a "set defect level" button is pressed. Moreover, the display of the indicating unit 502 is enlarged when an "enlarge display" button is pressed, and the screen is switched to a screen for displaying details of each of the defective printed materials when a "display details" button is pressed.

Figure 12:
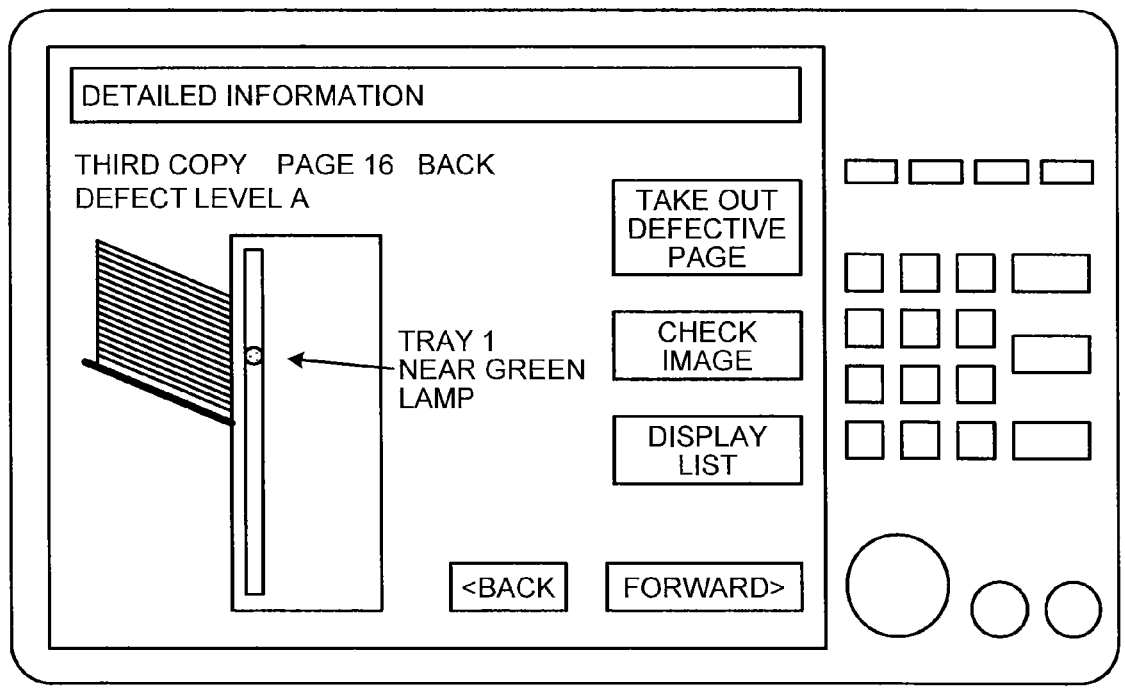
FIG. 12 is a diagram illustrating a screen for displaying details of each of the defective printed materials on the display screen of the test apparatus according to the embodiment of the present invention.

FIG. 12 is a diagram illustrating an example of the screen for displaying details of each of the defective printed materials to be displayed when the "display details" button illustrated in FIG. 11 is pressed. As illustrated in FIG. 12, one of the stacked positions of the defective printed materials stacked on the discharge tray 501 is displayed, and it is also displayed that the back side of the 16-th page of the third copy is the defective printed material and the defect level is A.

Furthermore, various buttons are provided in the display screen illustrated in FIG. 12. Specifically, when a "take out defective page" button is pressed, the test apparatus 4 is notified that the defective printed material displayed on the screen is taken out from the discharge tray 501. Moreover, when a "check image" button is pressed, an image of the defective printed material displayed on the screen is acquired and displayed from among tested images contained in the test result illustrated in FIG. 9. Furthermore, when a "display list" button is pressed, the screen is switched to the screen for displaying the list of the stacked positions of the defective printed materials as illustrated in FIG. 11. Moreover, when a "forward" button or a "back" button is pressed, the screen is switched to a screen for displaying details of another defective printed material.

Furthermore, it may be possible to distinguish the stacked position of the defective printed material being displayed on the screen from the stacked positions of the other defective printed materials by changing the color of the LED of the indicating unit 502 corresponding to the stacked position of the defective printed material being displayed on the display screen illustrated in FIG. 12 or by causing the LED to blink.

With the configuration as described above, the user can recognize not only the stacked position of the defective printed material but also detailed information for each of the defective printed materials on the display screen. Furthermore, if the stacked position of the defective printed material being displayed on the screen is indicated so as to be distinguished from the stacked positions of the other defective printed materials, the user can more easily detect a desired defective printed material.

Furthermore, the screens as illustrated in FIG. 11 and FIG. 12 may be displayed on a display screen of a mobile information processing apparatus (hereinafter, referred to as a "mobile terminal"), such as a smartphone or a tablet terminal equipped with information processing functions similar to those of a PC. In this case, the mobile terminal and the test apparatus 4 are connected so as to be able to communicate with each other, and detailed information on a defective printed material is displayed on the display control unit (not illustrated) of the test apparatus 4 and a display screen serving as a display unit of the mobile terminal.

Incidentally, a display control unit of the mobile terminal, instead of the display control unit of the test apparatus 4, may display the detailed information on the defective printed material on the display screen of the mobile terminal. In this case, the mobile terminal receives the test result obtained by the comparison test unit 404 and the stacked position calculated by the stacked position calculating unit 403b via a network I/F (not illustrated). Then, the display control unit of the mobile terminal displays the detailed information on the defective printed material on the display screen of the mobile terminal based on the received test result or information on stacking.

Figure 13:
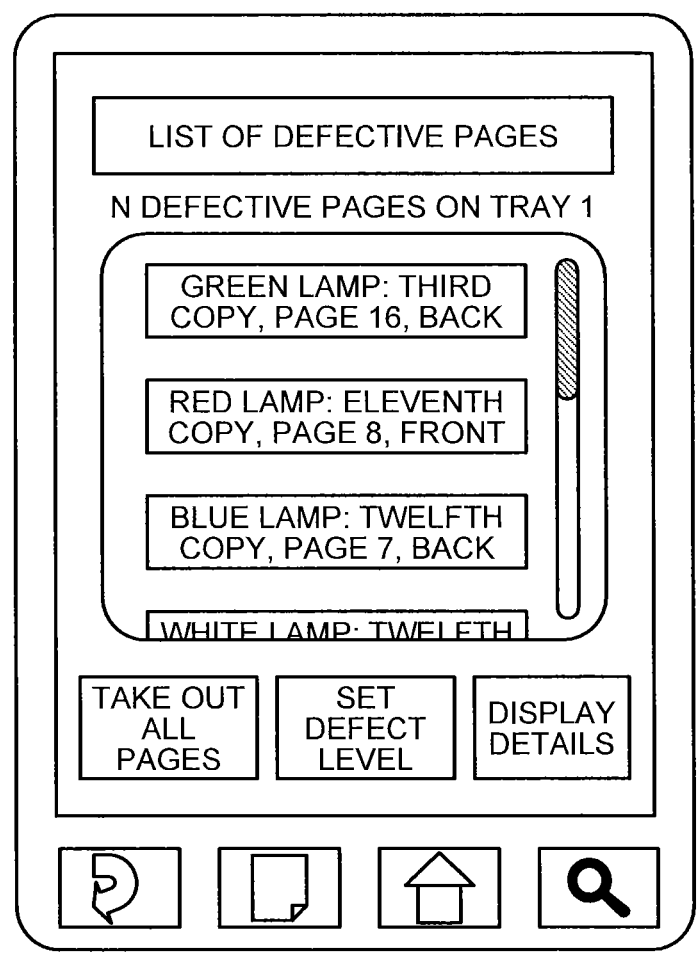
FIG. 13 is a diagram illustrating a screen for displaying a list of stacked positions of defective printed materials on a display screen of a mobile terminal according to the embodiment of the present invention.

FIG. 13 is a diagram illustrating an example of a screen for displaying a list of stacked positions of defective printed materials on the display screen of the mobile terminal. As illustrated in FIG. 13, a list is displayed, which contains the colors of the LEDs of the indicating unit 502 for indicating the stacked positions of respective defective printed materials and contains the side, the page number, and the copy number of each of the defective printed materials. Furthermore, on the display screen illustrated in FIG. 13, buttons with the same functions as the buttons illustrated in FIG. 11 are provided.

Figure 14:
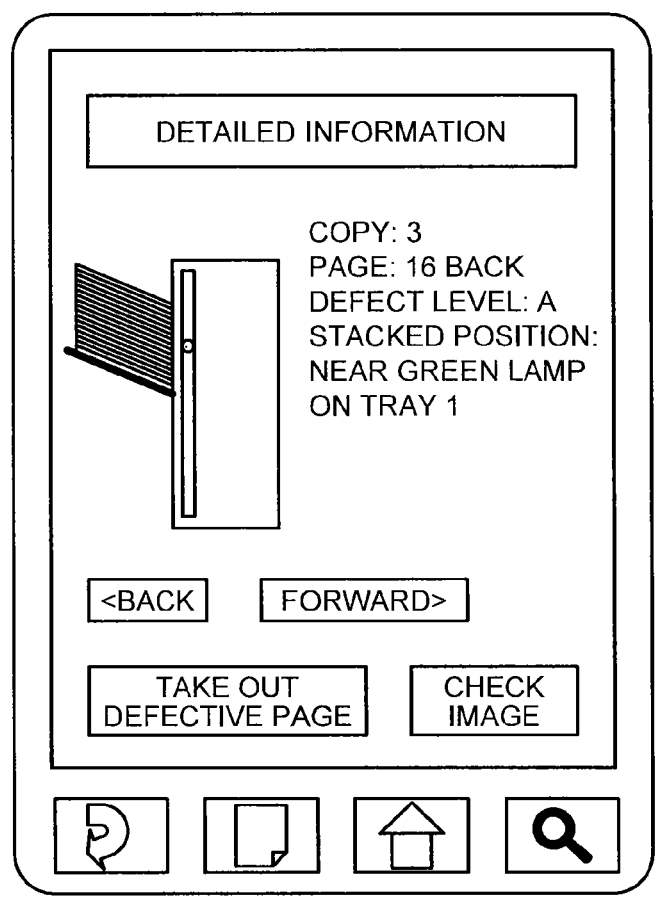
FIG. 14 is a diagram illustrating a screen for displaying details of each of the defective printed materials on the display screen of the mobile terminal according to the embodiment of the present invention.

FIG. 14 is a diagram illustrating a screen for displaying details of each of the defective printed materials to be displayed when a "display details" button illustrated in FIG. 13 is pressed. As illustrated in FIG. 14, one of the stacked positions of the defective printed materials stacked on the discharge tray 501 is displayed, and it is also displayed that the back side of the 16-th page of the third copy is the defective printed material and the defect level is A. Furthermore, on the display screen illustrated in FIG. 14, buttons with the same functions as the buttons illustrated in FIG. 12 are provided.

Moreover, similarly to the case where the screen illustrated in FIG. 12 is displayed on the LCD 60 of the test apparatus 4, it may be possible to distinguish the stacked position of the defective printed material being displayed on the screen from the stacked positions of the other defective printed materials by changing the color of the LED of the indicating unit 502 corresponding to the stacked position of the defective printed material being displayed on the display screen illustrated in FIG. 14 or by causing the LED to blink.

With the configuration as described above, it becomes possible to check, in a desired location, the screen displaying the detailed information on the defective printed material. Therefore, even when the LCD 60 of the test apparatus 4 is located out of sight from the location of the discharge tray 501, it becomes possible to check or take out the defective printed material stacked on the discharge tray 501 while checking an image or the like of the defective printed material via the mobile terminal. Therefore, the convenience for the user can be improved.

Incidentally, the image forming system according to the present embodiment may print a list of thumbnail images of the defective printed materials in addition to the printed materials, or the test apparatus 4 or the mobile terminal may display the list of the thumbnail images on the display screen. With this configuration, the user can check the list of the contents of the defective printed materials in addition to be able to check the stacked positions of the defective printed materials by the indicating unit 502 of the stacker 5. Therefore, it becomes possible to more easily take out the defective printed materials from the discharge tray 501.

Figure 15:
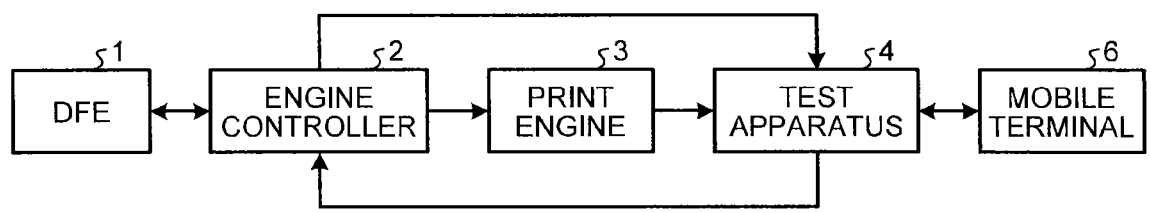
FIG. 15 is a diagram illustrating a configuration of an image forming system including the test apparatus and the mobile terminal according to the embodiment of the present invention.

A second embodiment will be explained below. In the second embodiment, in an image test system including a test apparatus that compares a read image obtained by reading an output result of a formed image with a master image to test the output result and including a mobile terminal equipped with a camera, a feature is to provide information on a printed material determined as defective. FIG. 15 is a diagram illustrating an overall configuration of an image forming system according to the present embodiment. As illustrated in FIG. 15, the image forming system according to the present embodiment includes the DFE 1, the engine controller 2, the print engine 3, the test apparatus 4, and a mobile terminal 6.

The DFE 1, the engine controller 2, the print engine 3, and the test apparatus 4 are the same as the DFE 1, the engine controller 2, and the test apparatus 4 explained above with reference to FIG. 1.

The mobile terminal 6 is a portable information processing terminal, such as a smartphone, a tablet terminal, a personal digital assistant (PDA), which is connected so as to be able to communicate with the test apparatus 4. The mobile terminal 6 includes a camera with an imaging function, and functions as a display panel for displaying an image captured and generated by the camera or information based on the test result obtained by the test apparatus 4.

A hardware configuration of the mobile terminal 6 is the same as the hardware configuration illustrated in FIG. 2. In the hardware configuration as illustrated in FIG. 2, programs stored in a recording medium, such as the ROM 30, the HDD 40, or an optical disk (not illustrated), are loaded into the RAM 20 and the CPU 10 performs calculations based on the programs, so that a software control unit is implemented. The software control unit implemented as described above and the hardware are combined to realize the functional blocks that implement the functions of the engine controller 2, the print engine 3, the test apparatus 4, and the mobile terminal 6 according to the present embodiment.

Figure 16:
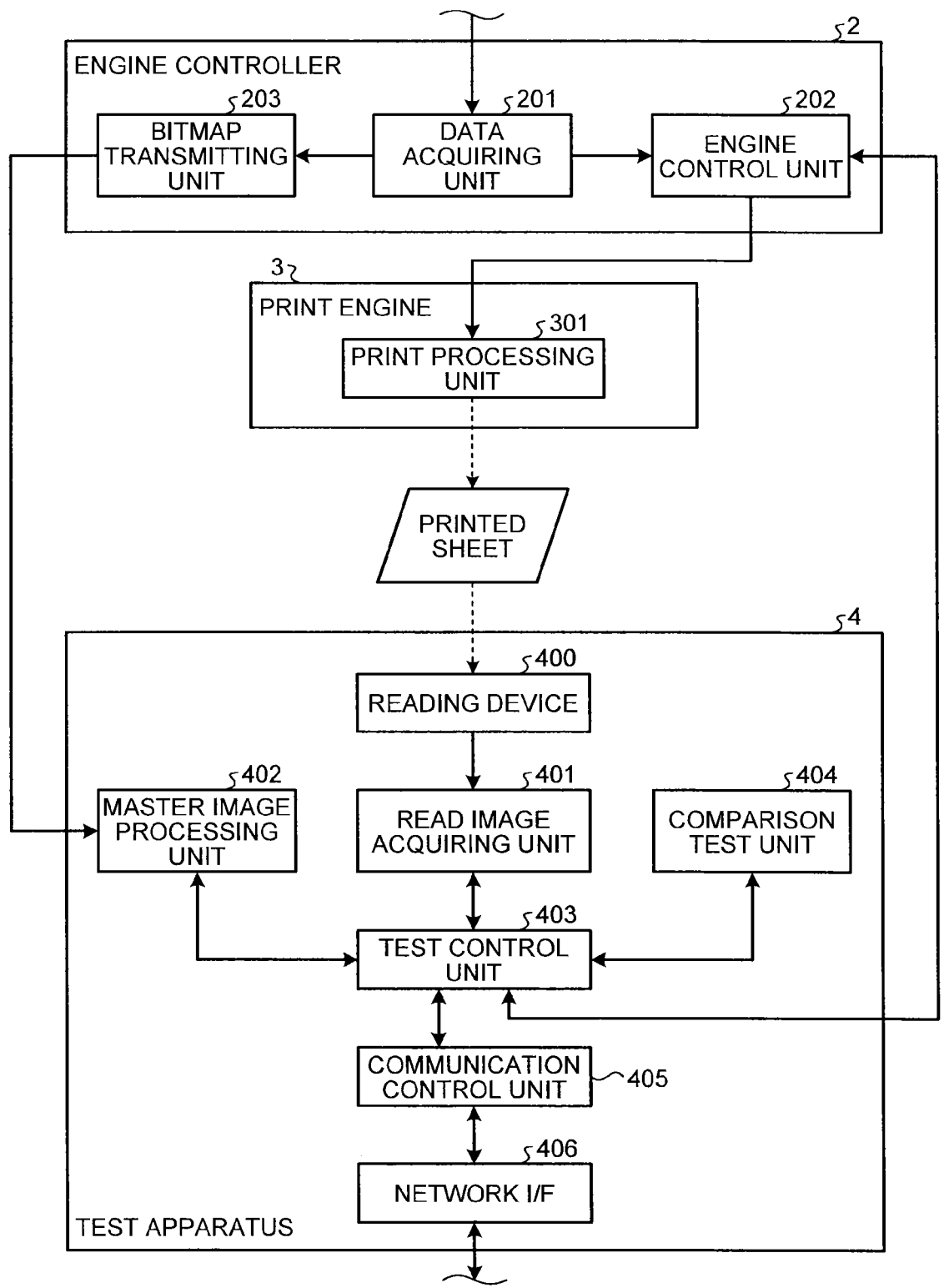
FIG. 16 is a block diagram illustrating functional configurations of the engine controller, the print engine, and the test apparatus according to the embodiment of the present invention.

FIG. 16 is a block diagram illustrating functional configurations of the engine controller 2, the print engine 3, and the test apparatus 4 according to the present embodiment. As illustrated in FIG. 16, the engine controller 2 and the print engine 3 according to the present embodiment have the same configurations as those of the engine controller 2 and the print engine 3 illustrated in FIG. 3, and the test apparatus 4 according to the present embodiment includes a communication control unit 405 and a network I/F 406 in addition to the components of the test apparatus illustrated in FIG. 3. In the following, explanation of the same components as those illustrated in FIG. 3 will be omitted.

The communication control unit 405 inputs a signal and a command input by the mobile terminal 6 via the network I/F 406 to the test control unit 403. Furthermore, the test control unit 403 controls the communication control unit 405 and transmits necessary information to the mobile terminal 6 via the network I/F 406. The network I/F 406 is an interface for enabling the test apparatus 4 to communicate with other devices, such as the mobile terminal 6, via the network. Examples of the interface to be employed include Ethernet (registered trademark), universal serial bus (USB), Bluetooth (registered trademark), and Wireless Fidelity (Wi-Fi).

Figure 17:
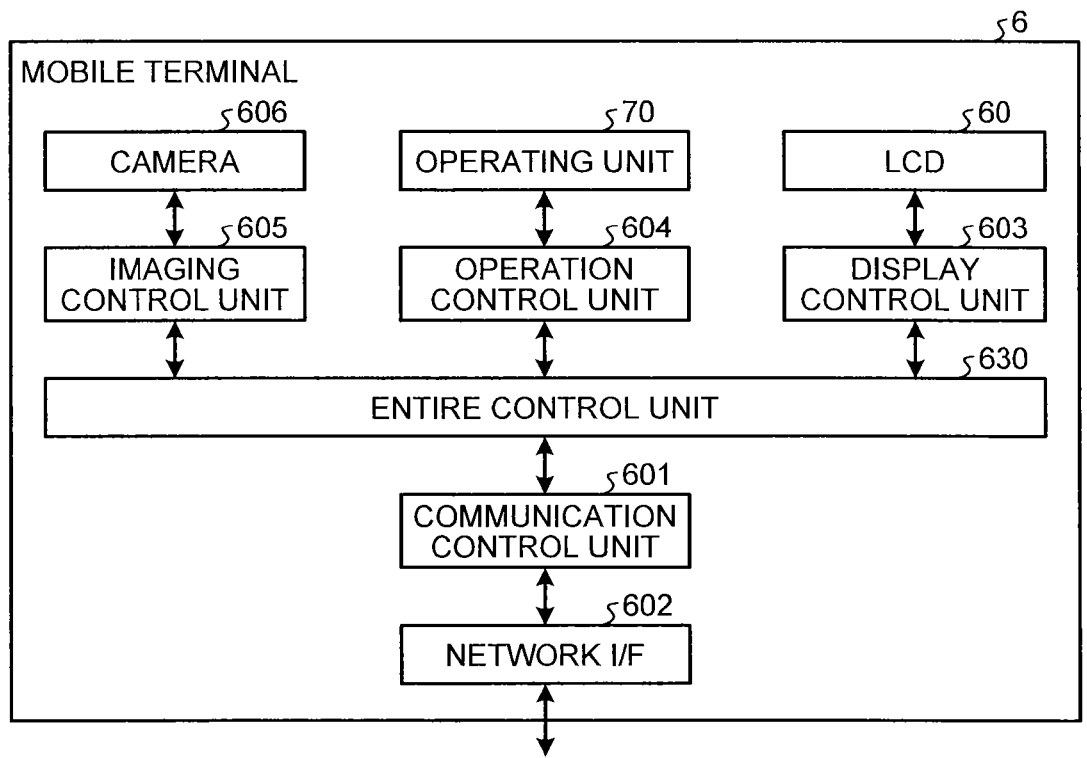
FIG. 17 is a block diagram illustrating a functional configuration of the mobile terminal according to the embodiment of the present invention.

The functional configuration of the mobile terminal 6 according to the present embodiment will be explained below with reference to FIG. 17. FIG. 17 is a block diagram illustrating the functional configuration of the mobile terminal 6 according to the present embodiment. As illustrated in FIG. 17, the mobile terminal 6 according to the present embodiment includes a communication control unit 601, a network I/F 602, a display control unit 603, an operation control unit 604, an imaging control unit 605, a camera 606, and an entire control unit 630, in addition to the LCD 60 and the operating unit 70 explained with reference to FIG. 2.

The communication control unit 601 inputs a signal and a command to the test apparatus 4 via the network I/F 602, acquires information, such as the test results, from the test apparatus 4 via the network I/F 602, and outputs the information to the entire control unit 630. The network I/F 602 is an interface for enabling the mobile terminal 6 to communicate with other devices, such as the test apparatus 4, via the network. Examples of the interface to be employed include Ethernet (registered trademark), USB, Bluetooth (registered trademark), and Wi-Fi.

The display control unit 603 displays a state of the mobile terminal 6, such as a graphical user interface (GUI) of the entire control unit 630 or an image captured and generated by the camera 606, on the LCD 60 serving as a display unit of the mobile terminal 6. The operation control unit 604 acquires a signal of contents of user's operation on the operating unit 70, and inputs the signal to a module, such as the entire control unit 630, that operates in the mobile terminal 6.

The imaging control unit 605 acquires, as digital data, an image captured and generated by the camera 606, and inputs the digital data to a module, such as the entire control unit 630, that operates in the mobile terminal 6. The camera 606 is an imaging mechanism that outputs, as digital data, an image captured by an imaging element, such as a charge coupled device (CCD) or a complementary metal oxide semiconductor (CMOS).

The entire control unit 630 controls the entire operation of the mobile terminal 6 by giving commands to each of the units of the mobile terminal 6. The entire control unit 630 includes basic software, such as an operating system (OS), and includes middleware and various applications.

In the system as described above, the feature of the present embodiment is to display, on the LCD 60 of the mobile terminal 6 by using augmented reality (AR), information for specifying a printed material in which a defect is detected (hereinafter, referred to as a "defective printed material") among printed materials discharged and stacked from the test apparatus 4. AR is a technology for displaying a virtual image in a superimposed manner on the image being displayed on the display. The process performed by the system according to the present embodiment will be described below.

Figure 18:
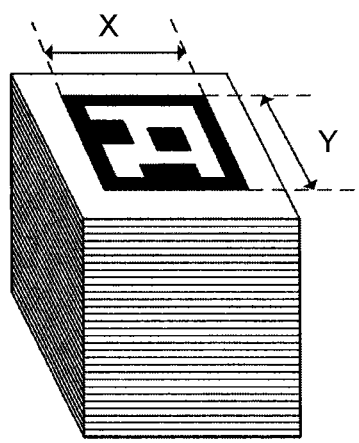
FIG. 18 is a diagram illustrating printed materials discharged and stacked from the test apparatus according to the embodiment of the present invention.

First, an example of printed materials discharged and stacked from the test apparatus 4 according to the present embodiment will be explained below. FIG. 18 is a diagram illustrating an example of the printed materials discharged and stacked from the test apparatus 4. Upon acquiring test results of each of print jobs from the comparison test unit 404, the test control unit 403 generates an AR marker as a pattern image (indicator image), such as a barcode, containing coded result identification information for uniquely identifying the test results, and outputs the AR marker to the engine control unit 202.

The engine control unit 202 causes the print engine 3 to form and output an image based on the image data of the AR marker input by the test control unit 403. Accordingly, as illustrated in FIG. 18, a printed material with an AR marker containing the result identification information on the printed material is stacked on the printed materials that have been discharged and stacked from the test apparatus 4. It is assumed that all AR markers in the present embodiment have fixed sizes (for example, the horizontal length is denoted by X and the vertical length is denoted by Y as illustrated in FIG. 18). Furthermore, each of the AR markers is printed in the center of a printed sheet.

Figure 19:
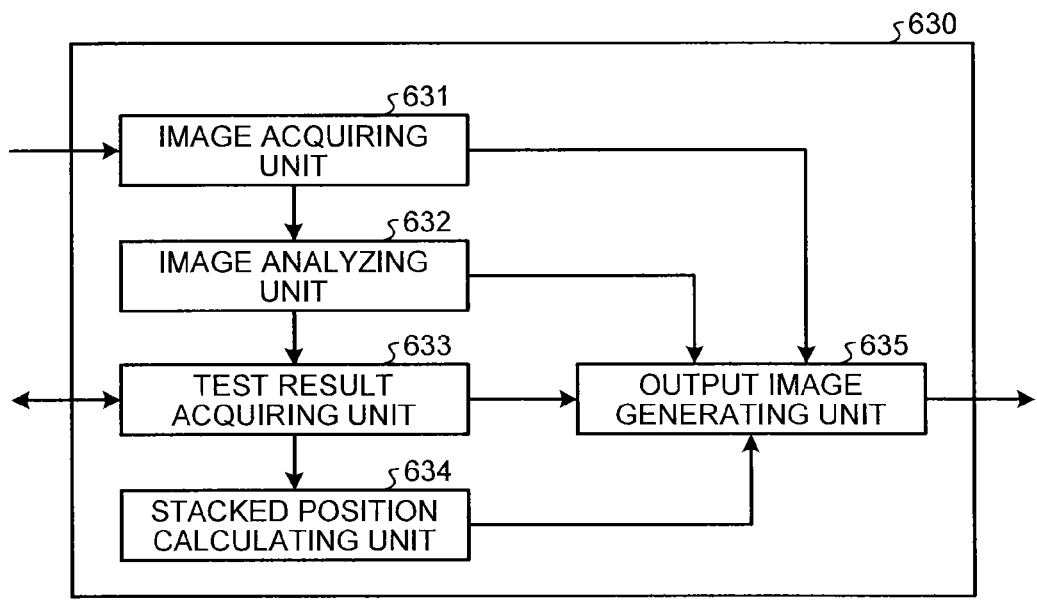
FIG. 19 is a block diagram illustrating a functional configuration of an entire control unit according to the embodiment of the present invention.

A function to display information for identifying a defective printed material by using AR among the functions of the entire control unit 630 of the mobile terminal 6 will be explained below with reference to FIG. 19. FIG. 19 is a block diagram illustrating a functional configuration of the entire control unit according to the present embodiment. As illustrated in FIG. 19, the entire control unit 630 according to the present embodiment includes an image acquiring unit 631, an image analyzing unit 632, a test result acquiring unit 633, a stacked position calculating unit 634, and an output image generating unit 635.

When the camera 606 is activated upon receiving a request for display using AR from a user via the operating unit 70 of the mobile terminal 6, the image acquiring unit 631 acquires an image being captured by the camera 606 and outputs the image to the image analyzing unit 632 and the output image generating unit 635.

Figure 20:
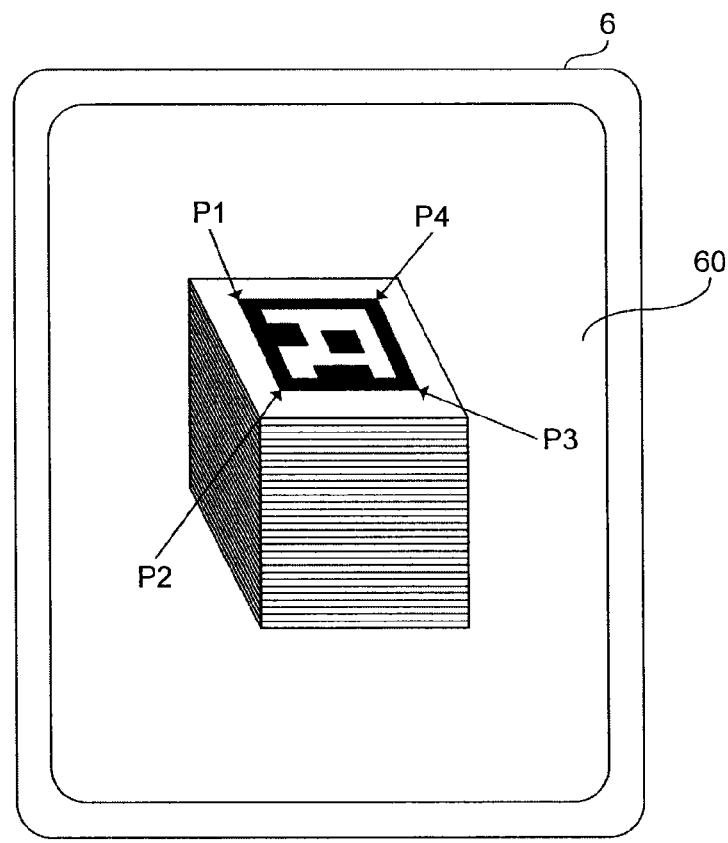
FIG. 20 is a diagram illustrating an image captured by a camera of the mobile terminal according to the embodiment of the present invention.

FIG. 20 is a diagram illustrating an image being captured by the camera 606. For example, as illustrated in FIG. 20, printed sheets on which a sheet with a printed AR marker is stacked are captured by the camera 606 and displayed on the LCD 60 of the mobile terminal 6, and the image acquiring unit 631 acquires the image being captured in this manner. Incidentally, coordinates P1 to P4 indicated on the printed materials displayed on the LCD 60 in FIG. 20 are illustrated to clarify the explanation of the present embodiment and are not actually displayed on the LCD 60.

The image analyzing unit 632 performs image processing on the image input by the image acquiring unit 631. When extracting the AR marker from the input image, the image analyzing unit 632 acquires the result identification information contained in the extracted AR marker and outputs the result identification information to the test result acquiring unit 633. Namely, the image analyzing unit 632 functions as an indicator image extracting unit that extracts the AR marker serving as an indicator image input by the image acquiring unit 631.

Furthermore, when extracting the AR marker, the image analyzing unit 632 acquires the coordinates of the four corners (hereinafter, referred to as "corner coordinates") of the AR marker extracted from the image being captured by the camera 606, and outputs the corner coordinates to the output image generating unit 635. As illustrated in FIG. 20, the corner coordinates of the AR marker are denoted by P1, P2, P3, and P4, and each of the coordinates P1 to P4 is denoted by a combination of a value on the x-coordinate (horizontal direction) and a value on the y-coordinate (vertical direction) on the LCD 60 (for example, P1=(x1, x2)).

The test result acquiring unit 633 causes the communication control unit 601 to notify the test apparatus 4 of a request to acquire test results corresponding to the result identification information input by the image analyzing unit 632 via the network I/F 602. Furthermore, the test result acquiring unit 633 acquires the test results input by the test apparatus 4 in response to the request to acquire the test results, and outputs the test results to the stacked position calculating unit 634 and the output image generating unit 635.

The test results are, as illustrated in FIG. 9 for example, represented in a table containing, as a single set (in a single row), a page number, a tested image, a sheet size, a sheet thickness, presence/absence of a defect, and a defect level (for example, the defect level is divided into A to E such that A indicates the lowest defect level and E indicates the highest defect level). From the test results as described above, the total number of the stacked printed materials indicates the total number of rows of the test results, and the order of a defective printed material in the printed materials is specified by the number assigned to a row containing "presence" in the field of presence/absence of a defect.

Incidentally, while the test result acquiring unit 633 acquires the test results from the test apparatus 4 based on the result identification information contained in the AR marker input by the image analyzing unit 632 in the present embodiment, it may be possible to acquire the test results input by user or the like, instead of based on the result identification information contained in the AR marker. In this case, the AR marker may not contain the result identification information.

Furthermore, the test result acquiring unit 633 may store the acquired test results in the ROM 30, the HDD 40, or the like of the mobile terminal 6 in association with the information on the AR marker. In this case, the mobile terminal 6 can acquire the test results without communicating with the test apparatus 4.

The stacked position calculating unit 634 calculates the stacked position of the defective printed material in the stacked printed materials based on the test result input by the test result acquiring unit 633. A method to calculate the stacked position of the defective printed material based on the test results will be explained in detail below. The stacked position corresponds to the height from the first stacked printed material to the defective printed material, and therefore, is obtained based on the thickness of each of the stacked printed sheets and the number of the stacked printed sheets. However, it is necessary to take into account the fact that a printed sheet is increasingly pressed due to the weights of other sheets as more and more printed sheets are stacked thereon and the thickness of the printed sheet becomes thinner than in the case where no printed sheet is stacked on the printed sheet (that is, the stacked position is lowered). Therefore, when a defective printed material is present between other stacked printed materials, the fact is taken into account that the stacked position is lowered due to the influence of sheets stacked on the defective printed material.

First, the thickness of an i-th sheet among a total of n stacked printed materials is calculated. Assuming that a normal thickness of the i-th sheet before other sheets are stacked on the i-th sheet is denoted by $t_i$, a thickness $t'_i$ of the i-th sheet when the influence of the other stacked sheets is taken into account is obtained by Equation (3) below, where n and i are integers.

$$t'_i = t_i - f(n,i)(1 \leq i \leq n) \qquad (3)$$

Incidentally, f(n, i) is a function to calculate the amount of decrease in the thickness of the i-th sheet among the n sheets due to the pressure applied by the other stacked sheets. Namely, the number of sheets stacked on a target sheet is reduced as the value of i approaches the value of n, so that the value of f(n, i) is reduced. Furthermore, when i=n, f(n, i)=0 because no sheet is stacked on the target sheet.

When the n printed materials are stacked, and if an m-th sheet is a defective printed material according to Equation (3), the height from the first printed material of the n printed materials to the m-th defective printed material, that is, a stacked position $H_m$, is obtained by Equation (4) below.

$$H_m = \sum_{i=1}^{m} t'_i = \sum_{i=1}^{m} \{t_i - f(n, i)\} \qquad (4)$$

The stacked position calculating unit 634 outputs the stacked position calculated as described above to the output image generating unit 635. Namely, the stacked position calculating unit 634 functions as a defect position calculating unit that calculates a defect position indicating the stacked position of the defective printed material among the printed materials.

The output image generating unit 635 generates an output image to be displayed on the LCD 60 of the mobile terminal 6, based on the image input by the image acquiring unit 631, the corner coordinates of the AR marker input by the image analyzing unit 632, the test results input by the test result acquiring unit 633, and the stacked positions input by the stacked position calculating unit 634.

Figure 21:
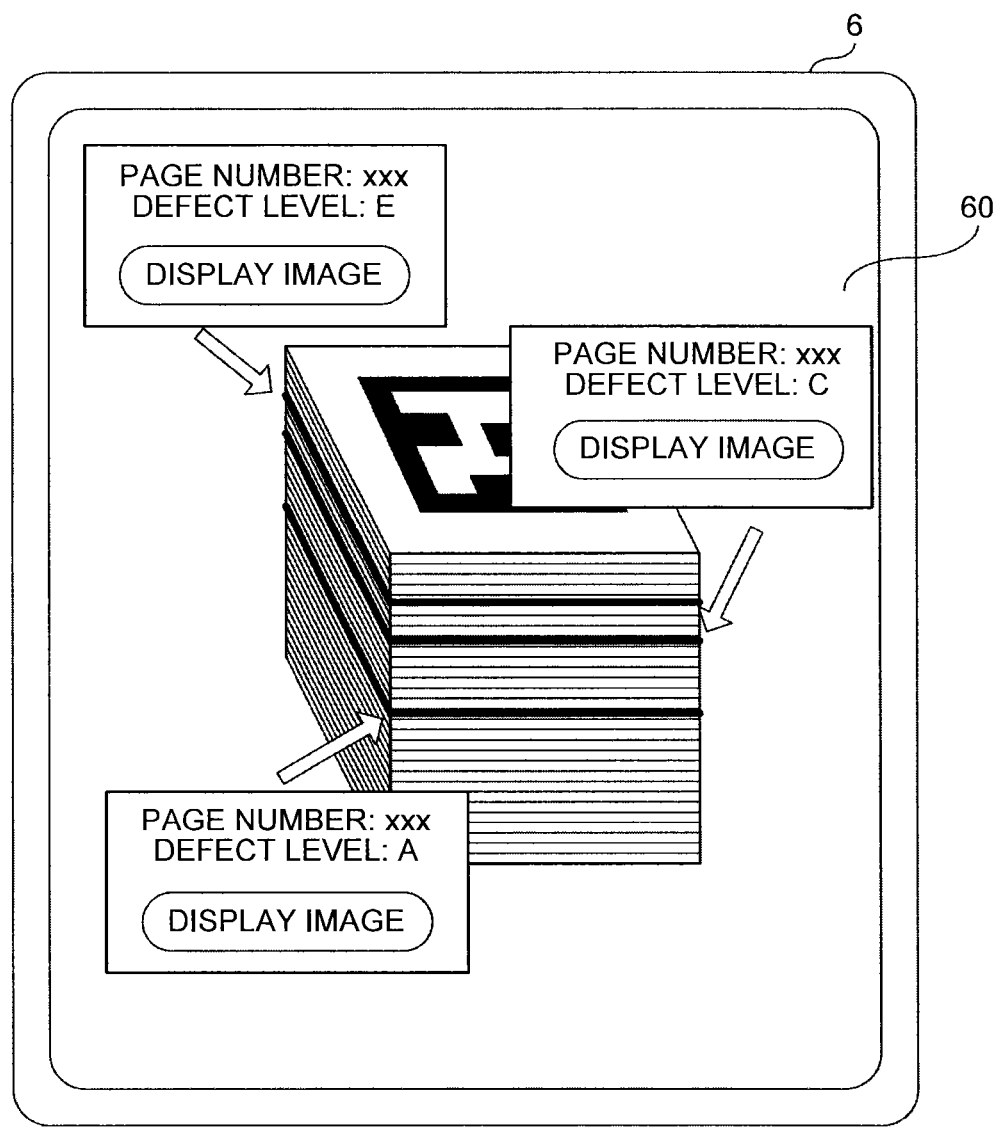
FIG. 21 is a diagram illustrating a display screen using augmented reality (AR) on the mobile terminal according to the embodiment.

FIG. 21 is a diagram illustrating an example of a display screen using AR on the mobile terminal 6. The output image is obtained by, as illustrated in FIG. 21 for example, superimposing an image containing lines (position identification information for identifying respective stacked positions) indicating the stacked positions of the respective defective printed materials, the page number of the respective defective printed materials, the defect level, and an image display button for displaying the respective defective printed materials onto the image of the printed materials being captured by the camera 606 as illustrated in FIG. 20. A method to generate the output image will be explained in detail below.

Figure 22:
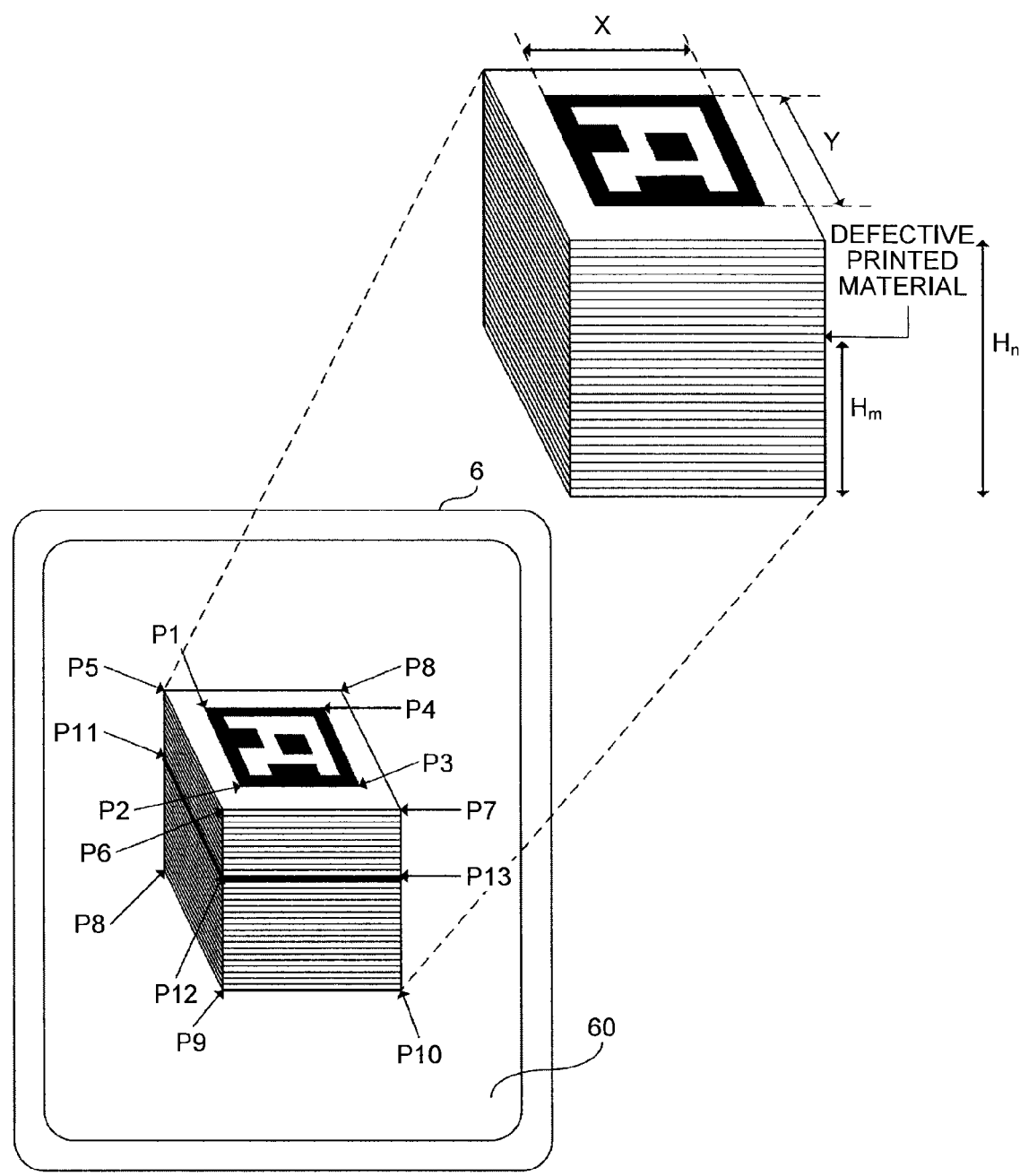
FIG. 22 is a diagram illustrating stacked printed materials and a display screen of the mobile terminal capturing the printed materials according to the embodiment of the present invention.

FIG. 22 is a diagram illustrating an example in which the stacked printed materials captured by the camera 606 of the mobile terminal 6 are displayed on the LCD 60. Incidentally, the coordinates indicated on the printed materials displayed on the LCD 60 in FIG. 22 are illustrated to clarify the explanation of the present embodiment and are not actually displayed on the LCD 60. The image of the printed materials being captured by the camera 606 as illustrated in FIG. 22 is input by the image acquiring unit 631.

The line indicating the stacked position of a defective printed material is generated by, for example, connecting coordinates P11 and P12 by a straight line and connecting coordinates P12 and P12 by a straight line in FIG. 22. A detailed method to calculate the coordinates will be explained below with reference to FIG. 22. First, the output image generating unit 635 calculates a coordinate transform matrix to transform the coordinates in a three-dimensional space in which the stacked printed materials are actually present to the coordinates on the image plane of the LCD 60 displaying the captured image.

The coordinate transform matrix is obtained by a relationship of the inclination, the vertical length, and the horizontal length of the AR marker obtained based on the corner coordinates P1 to P4 of the AR marker input by the image analyzing unit 632 with respect to the vertical length and the horizontal length of the printed AR marker. The relationship represents an angle, inclination, a distance, or the like, with which the printed materials are captured. Namely, with the coordinate transform matrix as described above, it is possible to calculate the value of each of the coordinates of the printed materials that are displayed on the LCD 60 by capturing the printed materials in the three-dimensional space, in accordance with the angle, the inclination, the distance, or the like with which the imaging is performed.

Subsequently, the output image generating unit 635 calculates values of the coordinates P5, P6, and P7 of corners among the four corners of the sheet on which the AR marker is printed on the image plane. The coordinates can be obtained based on the corner coordinates P1 to P4 of the AR marker, a printed position of the AR marker on the printed sheet, the vertical and the horizontal lengths of the printed AR marker, and the coordinate transform matrix as described above.

Specifically, in the present embodiment, as illustrated in FIG. 22, because the AR marker is printed in the center of the printed sheet, the widths of top, bottom, right, and left margins are obtained based on the horizontal length X and the vertical length Y of the printed AR marker and based on the size of the printed sheet. The values of the corner coordinates P5 to P7 of the sheet on which the AR marker is printed can be obtained based on the corner coordinates P1 to P3 of the AR marker, the obtained widths of the margins, and the coordinate transform matrix.

Subsequently, the output image generating unit 635 calculates values of the coordinates P8, P9, and P10 of corners among the four corners of the first printed material on the image plane. The coordinates can be obtained based on the corner coordinates P5 to P7 of the sheet on which the AR marker is printed as described above, the height of the stacked printed materials (namely, the height Hn from the first printed material to the n-th printed material when a total of n printed materials are stacked), and the coordinate transform matrix as described above. The output image generating unit 635 calculates values of the coordinates P11, P12, and P13 based on the coordinates P8 to P10 obtained as described above, the stacked position Hm input by the stacked position calculating unit, and the coordinate transform matrix. Namely, the output image generating unit 635 functions as a coordinate transforming unit that generates a coordinate transform matrix indicating transform information on transform into the coordinate system of the image plane based on the form of the AR marker, and that transforms the stacked position Hm into the coordinate system of the image plane based on the generated coordinate transform matrix. Incidentally, the form of the AR marker includes not only the shape of the AR marker but also the size, the angle, the inclination, the distance, or the like with which the imaging is performed.

The output image generating unit 635 acquires the page number and the defect level of each of the defective printed materials contained in the test results input by the test result acquiring unit 633, and generates an image containing the page number, the defect level, and the image display button for each of the defective printed materials as illustrated in FIG. 21. Furthermore, the output image generating unit 635 arranges the generated images so as to clearly indicate association with the lines indicating the stacked positions of the respective defective printed materials. For example, as illustrated in FIG. 21, the generated images are arranged with arrow images indicating the lines of the respective stacked positions. The output image generating unit 635 outputs and displays the output image generated as described above on the LCD 60 of the mobile terminal 6.

Figure 23:
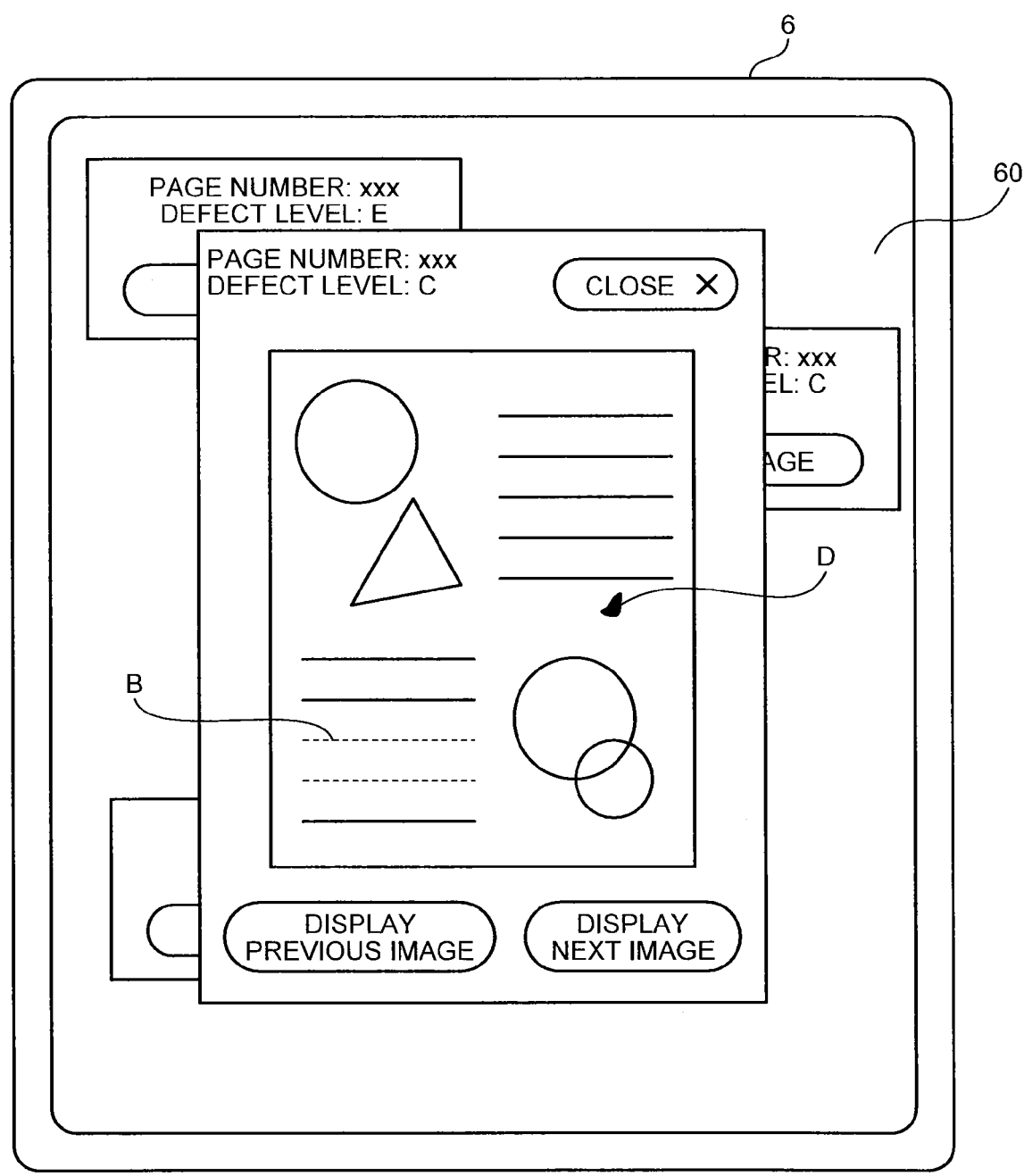
FIG. 23 is a diagram illustrating a display screen displaying an image of a defective printed material on the mobile terminal according to the embodiment of the present invention.

FIG. 23 is a diagram illustrating an example of a screen of the mobile terminal 6 for displaying an image of a defective printed material. When the image display button illustrated in FIG. 21 is pressed, the output image generating unit 635 displays the image of the defective printed material corresponding to the image display button pressed on the LCD 60 of the mobile terminal 6. Specifically, for example, the output image generating unit 635 acquires the image of the tested defective printed material contained in the test results input by the test result acquiring unit 633, and displays the acquired image on the display screen illustrated in FIG. 21 in a superimposed manner. For example, a dot stain D and a blurred image B are confirmed in the image of the defective printed material illustrated in FIG. 23.

Furthermore, the output image generating unit 635 generates, as illustrated in FIG. 23, the page number and the defect level of the defective printed material, a "close" button, a "display previous image" button, and a "display next image" button, in addition to the image of the defective printed material. When the "close" button is pressed, the image of the defective printed material displayed on the LCD 60 is hidden. When the "display previous image" button is pressed, an image of a previously-detected defective printed material is displayed. When the "display next image" button is pressed, an image of a subsequently-detected defective printed material is displayed.

As described above, through the above process, the user can confirm the stacked position of the defective printed material only by capturing the printed material containing the AR marker by using the camera. Therefore, it becomes not necessary to separate sheet discharge destinations for normal printed materials and defective printed materials. Consequently, even after a printed material is determined as a normal printed material, it becomes possible to omit cumbersome operation to return the defective printed material to a correct page of the normal printed materials discharged on a different discharge tray from that of the defective printed material. Furthermore, the mobile terminal 6 displays the image of the defective printed material in a superimposed manner according to selection by the user. Therefore, the user can easily confirm the contents of the defective printed material.

Incidentally, while an example is explained in the present embodiment that all of the AR markers have fixed sizes and are printed in the centers of the printed sheets, the present invention is not limited thereto. For example, it is sufficient that the output image generating unit 635 can acquire the size of the AR marker by, for example, providing the size of the AR marker as size information in the AR marker. Furthermore, as for the print position, it is sufficient that the AR marker is placed so that the output image generating unit 635 can acquire the coordinates of the corners of the sheet based on the size of the AR marker and based on the sheet size by, for example, printing the AR marker so as to match the top left corners with the printed sheet.

Moreover, while an example is explained in the present embodiment that the functional components illustrated in FIG. 19 are included in the mobile terminal 6, all or a part of the functional components may be included in the test apparatus 4. Specifically, when all of the functional components are included in the test apparatus 4, the test apparatus 4 functions as an image test apparatus with the features as described below. That is, the test apparatus 4 is an image test apparatus connected to an information processing terminal equipped with an imaging function, and performs a test to determine a defect in a read image obtained by reading an image formed and output on a recording medium. The image test apparatus includes an image acquiring unit that acquires a captured image captured and generated by the imaging function; an indicator image extracting unit that extracts, from the acquired captured image, a predetermined indicator image displayed based on a predetermined positional relationship with respect to a stacked position of tested sheets; a test result acquiring unit that acquires information on test results of the tested sheets; a defect position calculating unit that calculates a position of a defective sheet in which a defect is detected among the stacked tested sheets based on the information on the test results; a coordinate transform unit that generates transform information for transforming a coordinate system of the calculated position of the defective sheet into a coordinate system of the captured image based on the extracted indicator image, and that transforms the calculated position of the defective sheet into the coordinate system of the captured image based on the generated transform information; and an output image generating unit that generates an image by superimposing, on the acquired captured image, position identification information for identifying a stacked position of a sheet corresponding to a read image in which the defect is detected among the stacked tested sheets based on the position of the defective sheet that has been transformed into the coordinate system of the captured image.

Furthermore, while the present embodiments is implemented as one function of the mobile terminal 6 that is used as a display panel of the test apparatus 4 for displaying information or the like based on the test results obtained by the test apparatus 4, the present embodiment may be implemented as a software application that can be installed in other general-purpose mobile terminals.

In the present embodiment, an example is explained in which the printed materials, on top of which a sheet with a printed AR marker is stacked, are captured by the camera 606 to display a stacked position of a defective printed material on the LCD 60 of the mobile terminal 6. Alternatively, it may be possible to cause the camera 606 to capture the printed materials placed on a predetermined position and the AR marker placed on another predetermined position different from the position of the printed materials, and to display a stacked position of a defective printed material on the LCD 60 of the mobile terminal 6.

Figure 24:
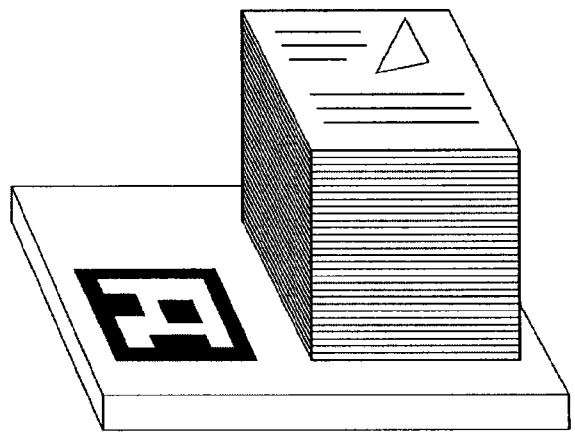
FIG. 24 is a diagram illustrating printed materials placed in a predetermined position and an AR marker placed in another predetermined position according to the embodiment of the present invention.

FIG. 24 is a diagram illustrating an example in which printed materials are placed in a predetermined position and an AR marker is placed in another predetermined position different from the position of the printed materials. As illustrated in FIG. 24, for example, the AR marker is placed in a position on the left side of the printed materials by being separated by a predetermined distance. The printed materials are placed on, for example, the discharge tray 501 of the test apparatus 4 on which the printed materials are discharged or a special place for the printed materials.

In the embodiment as described above, it becomes not necessary to stack a printed material with the printed AR marker on the printed materials for each of the print jobs. Therefore, for example, the mobile terminal 6 can acquire, via the AR marker, multiple pieces of the result identification information for identifying test results of printed materials corresponding to multiple print jobs or can acquire the order of stack of printed materials corresponding to each of the print jobs.

Figure 25:
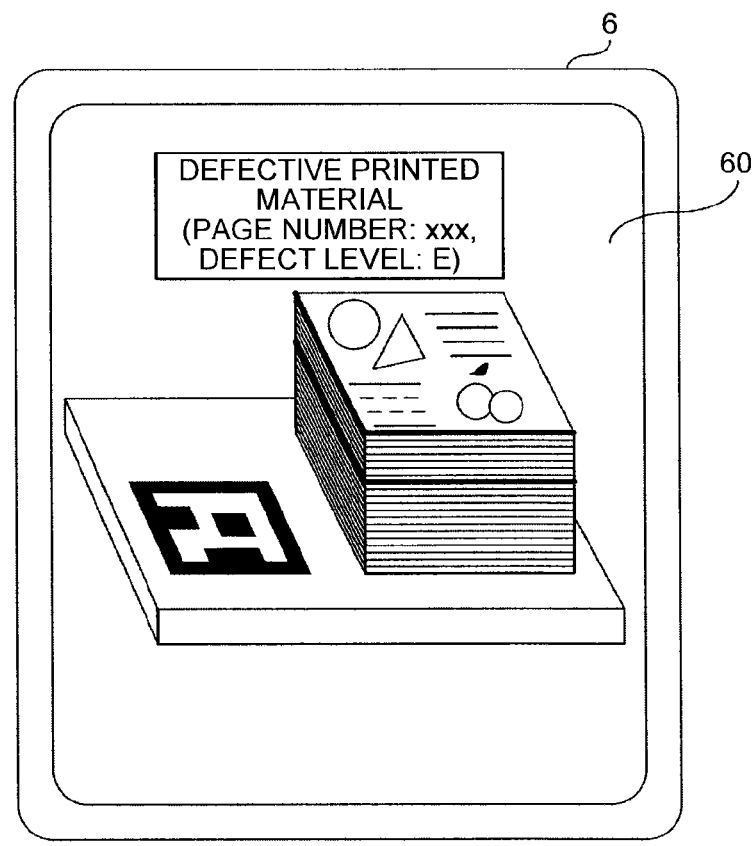
FIG. 25 is a diagram illustrating a display screen displaying the printed materials and the AR marker captured by the camera of the mobile terminal according to the embodiment of the present invention.

FIG. 25 is a diagram illustrating an example of a display screen of the printed materials and the AR marker illustrated in FIG. 24 captured by the camera 606. In the configuration as described above, the AR marker is not hidden even when a user turns a page of the printed materials while capturing the printed materials by the camera 606. Therefore, the mobile terminal 6 can display the stacked position of the defective printed material even when a page of the printed material is turned.

Furthermore, as illustrated in FIG. 25, when a page is turned and the camera 606 captures a page of the defective printed material, the output image generating unit 635 generates an image indicating that the image corresponds to the defective printed material or a page number, and superimpose the generated image on the image illustrated in FIG. 25. Whether the page being captured corresponds to the defective printed material is determined by, for example, causing an image determining unit (not illustrated) of the entire control unit 630 to acquire the image of the defective printed material from the test results and determine whether the acquired image and the captured image (image on the sheet) match with each other.

Furthermore, the mobile terminal 6 can display, on the LCD 60, stacked positions of printed materials corresponding to each of the print jobs among the stacked printed materials based on multiple pieces of the result identification information contained in the AR marker.

In the embodiment as described above, because the AR marker is arranged in a different position from the position of the printed materials, the mobile terminal 6 can display the stacked position of the defective printed material even when the user turns a page of the printed materials and the AR marker is hidden. Furthermore, when the page of the defective printed material is captured while a user is turning pages of the printed materials being captured, it may be possible to superimpose a notification image as an image for displaying that the printed material is the defective printed material on the captured image and gives a notice of the defective printed material in real time. Therefore, the user can promptly recognize the defective printed material.

Moreover, as described above, the mobile terminal 6 can acquire, via the AR marker, multiple pieces of the result identification information for identifying test results of printed materials corresponding to multiple print jobs or can acquire the order of stack of printed materials corresponding to each of the print jobs. Therefore, it becomes possible to display stacked positions of defective printed materials among the printed materials printed by the multiplied print jobs. Consequently, the user can recognize the stacked positions of the defective printed materials at once from among the printed materials printed by the multiple print jobs.

In the embodiment as described above, while the mobile terminal 6 displays necessary information based on the information on the AR marker captured by the camera 606, it may be possible to store the entire image including the AR marker captured by the camera 606 and display necessary information based on the stored image. This embodiment will be explained below.

Figure 26:
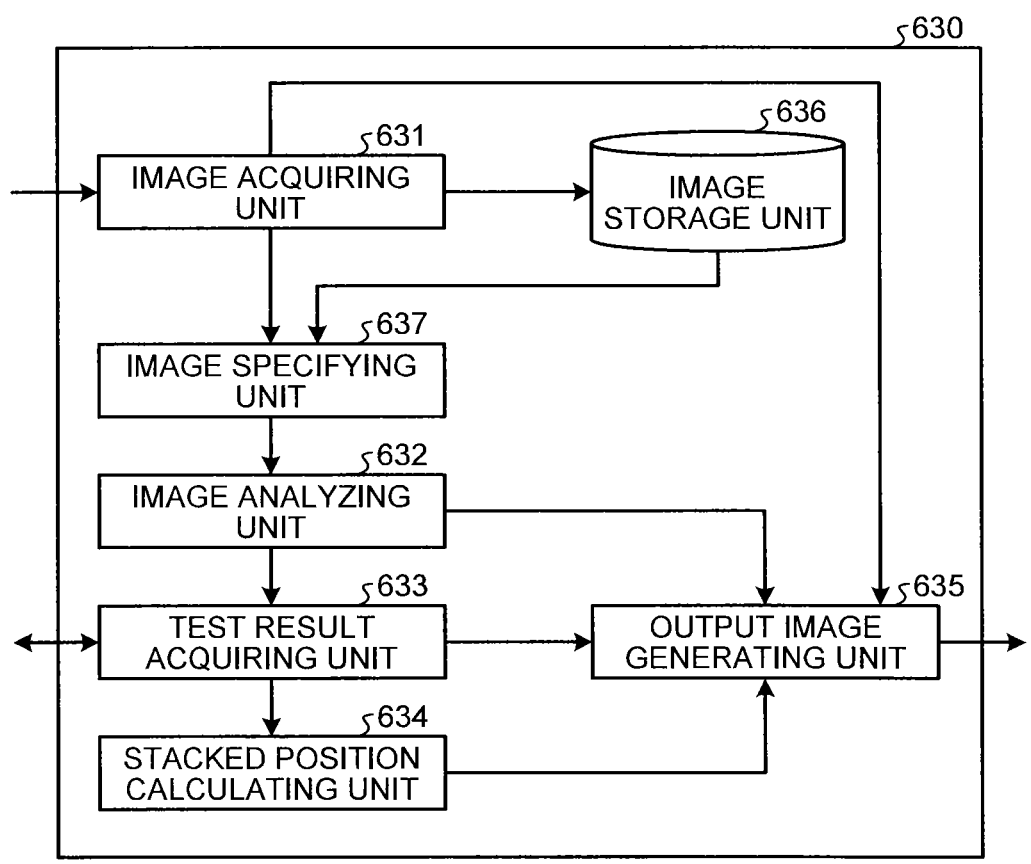
FIG. 26 is a block diagram illustrating a functional configuration of the entire control unit according to the embodiment of the present invention.

FIG. 26 is a diagram illustrating an example of a functional configuration according to an embodiment, in which an image stored in the entire control unit 630 is used. As illustrated in FIG. 26, the entire control unit 630 includes an image storage unit 636 and an image specifying unit 637, in addition to the components used for displaying information based on the information on the captured AR marker.

When receiving an instruction to store an image from a user via the operating unit 70 of the mobile terminal 6, the image acquiring unit 631 stores the acquired captured image in the image storage unit 636. The image stored in the image storage unit 636 at this time is the entire image containing all of components including the AR marker captured by the camera 606, a background, and the like. Furthermore, the image acquiring unit 631 acquires the image captured by the camera 606 and outputs the acquired image to the image specifying unit 637.

The image specifying unit 637 specifies, from among images (hereinafter, referred to as "reference images") stored in the image storage unit 636, an image that is determined as being matched with an image (hereinafter, referred to as an "input image") input by the image acquiring unit 631. Specifically, for example, the image specifying unit 637 extracts feature data of each of the reference images and the input image, and when the feature data of any of the reference images is close to the feature data of the input image based on a predetermined threshold, determines that the reference image is an image that matches the input image.

A process for extracting the feature data includes, for example, a process for extracting keypoints effective for recognition from the image and a process for generating feature data for each of the extracted keypoints. The process for extracting the keypoints is implemented by, for example, extracting pixels of corners by using a corner detection filter. Furthermore, the process for generating the feature data is implemented by, for example, a scale-invariant feature transform (SIFT) or a speeded-up robust features (SURF).

Subsequently, the image specifying unit 637 outputs the specified image to the image analyzing unit 632. The image analyzing unit 632 analyzes the image input by the image specifying unit 637 instead of the image captured by the camera 606.

With the configuration as described above, the mobile terminal 6 can display information on the defective printed material by using the AR marker contained in the stored image that matches the captured entire image, instead of using the AR marker captured by the camera 606. Therefore, even when the captured AR marker is hidden by turning a page or the like, it becomes possible to acquire the information from the stored AR marker. Consequently, it becomes possible to give a notice that a page being captured after pages are turned is a defective printed material in real time.

Alternatively, the mobile terminal 6 may store the image generated by the output image generating unit 635. With this configuration, it becomes possible to store an image containing information on the stacked position of the defective printed material and the defective printed material. Therefore, even when the states of the printed materials are changed from the captured states by binding the printed materials into a book or the like, the user can use the stored image as reference information for checking the stacked position of the defective printed material.

According to an embodiment of the present invention, it becomes possible to indicate the position of the defective printed material in a simpler and clearer manner than in the conventional technology.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image test apparatus that tests a read image obtained by reading an image formed and output on a recording medium, the image test apparatus comprising:
   circuitry configured to
      acquire a determination result of a defect in the read image based on a difference between the read image and a test image for testing the read image;
      acquire a sheet type of a sheet from which the read image is read;
      calculate a stacked position of a sheet of a defective read image, which is an image in which the defect is detected in the determination on the defect among sheets stacked on a discharge tray serving as a discharge destination of the sheet of the read image, on the discharge tray based on the determination result and the acquired sheet type; and
      indicate a height at predetermined intervals in a direction in which the sheets are stacked on the discharge tray based on the calculated stacked position.

2. The image test apparatus according to claim 1, wherein the circuitry calculates the stacked position in accordance with a pressure applied to the sheet of the defective read image due to weights of other sheets stacked on the sheet of the defective read image.

3. The image test apparatus according to claim 1, wherein the circuitry is configured to control display of information on the defective read image.

4. The image test apparatus according to claim 3, wherein the information on the defective read image is a list of the defective read image.

5. The image test apparatus according to claim 3, further comprising a display, wherein the circuitry is configured to control display of the information on the defective read image on the display.

6. The image test apparatus according to claim 3, wherein the circuitry controls display of the information on the defective read image on a display of a portable information processing terminal connected to the image test apparatus.

7. An image test system, comprising:
an image test apparatus that performs a test to determine a defect in a read image obtained by reading an image formed and output on a recording medium;
an information processing terminal that is enabled to communicate with the image test apparatus and that has an imaging function; and
circuitry configured to
acquire a captured image captured and generated by the imaging function;
extract, from the acquired captured image, a predetermined indicator image displayed based on a predetermined positional relationship with respect to a stacked position of tested sheets;
acquire information on test results of the tested sheets;
calculate a position of a defective sheet in which a defect is detected among the stacked tested sheets based on the information on the test results;
a generate transform information for transforming a coordinate system of the calculated position of the defective sheet into a coordinate system of the captured image based on the extracted indicator image, and transform the calculated position of the defective sheet into the coordinate system of the captured image based on the generated transform information; and
generate an image by superimposing, on the acquired captured image, position identification information for identifying a stacked position of a sheet corresponding to a defective read image in which the defect is detected among the stacked tested sheets based on the position of the defective sheet that has been transformed into the coordinate system of the captured image.

8. The image test system according to claim 7, wherein the predetermined positional relationship indicates that a sheet on which the indicator image is formed and output is stacked on the tested sheets.

9. The image test system according to claim 7, wherein the predetermined positional relationship indicates that the indicator image is arranged in a predetermined position different from a position where the tested sheets are stacked.

10. The image test system according to claim 9, wherein the circuitry is configured to
determine whether an image on a sheet generated by capturing each of the stacked tested sheets by the imaging function corresponds to the defective read image, and
when the image on the sheet corresponds to the defective read image, generate an image by superimposing a notification image on the captured image, the notification image being an image for indicating that the image on the sheet corresponds to the defective read image.

11. The image test system according to claim 7, wherein the circuitry is configured to
store the acquired captured images; and
specify, from the stored captured images, a captured image corresponding to the captured image captured and generated by the imaging function, wherein
the circuitry extracts the indicator image from the specified captured image.

12. The image test system according to claim 7, wherein the circuitry generates an image by superimposing information on the defective read image on the captured image based on the acquired information on the test results.

13. The image test system according to claim 7, wherein the circuitry generates an image by superimposing the defective read image on the captured image based on the acquired information on the test results.

14. The image test system according to claim 7, wherein
the indicator image contains coded result identification information for identifying the test results, and
the circuitry acquires information on the test results based on the coded result identification information contained in the extracted indicator image.

15. An image testing method for testing a read image obtained by reading an image formed and output on a recording medium, the image testing method comprising:
acquiring a determination result of a defect in the read image based on a difference between the read image and a test image for testing the read image;
acquiring a sheet type of a sheet from which the read image is read;
calculating, by circuitry of an image testing apparatus, a stacked position of a sheet of a defective read image, which is an image in which the defect is detected in the determination on the defect among sheets stacked on a discharge tray serving as a discharge destination of the sheet of the read image, on the discharge tray based on the determination result and the acquired sheet type; and
indicating, by the circuitry, a height at predetermined intervals in a direction in which the sheets are stacked on the discharge tray based on the calculated stacked position.

16. The image test method according to claim 15, wherein the stacked position is calculated by the circuitry in accordance with a pressure applied to the sheet of the defective read image due to weights of other sheets stacked on the sheet of the defective read image.

17. The image test method according to claim 15, further configuring displaying information on the defective read image.

18. The image test method according to claim 17, wherein the information on the defective read image is a list of the defective read image.

19. The image test method according to claim 17, further comprising controlling, by the circuitry, display of the information on the defective read image on a display of an image testing apparatus.

20. The image test method according to claim 17, further comprising controlling, by the circuitry, display of the information on the defective read image on a display of a portable information processing terminal connected to an image test apparatus.

* * * * *